US009600638B2

(12) United States Patent
Kobayashi et al.

(10) Patent No.: US 9,600,638 B2
(45) Date of Patent: Mar. 21, 2017

(54) INFORMATION PROCESSING APPARATUS, INFORMATION PROCESSING METHOD, AND PROGRAM

(75) Inventors: Yoshiyuki Kobayashi, Tokyo (JP); Motoki Kato, Kanagawa (JP); Hiroshi Kuno, Kanagawa (JP); Takamichi Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 204 days.

(21) Appl. No.: 14/117,948

(22) PCT Filed: Apr. 13, 2012

(86) PCT No.: PCT/JP2012/060118
§ 371 (c)(1),
(2), (4) Date: Nov. 15, 2013

(87) PCT Pub. No.: WO2012/165061
PCT Pub. Date: Dec. 6, 2012

(65) Prior Publication Data
US 2014/0090083 A1    Mar. 27, 2014

(30) Foreign Application Priority Data

May 27, 2011   (JP) ................................. 2011-118574

(51) Int. Cl.
*G06F 7/04*         (2006.01)
*G06F 21/10*        (2013.01)
(Continued)

(52) U.S. Cl.
CPC .......... *G06F 21/10* (2013.01); *G11B 20/0021* (2013.01); *G11B 20/00253* (2013.01);
(Continued)

(58) Field of Classification Search
CPC .......... H04L 63/0823; G11B 20/00253; G11B 20/0021
(Continued)

(56) References Cited

U.S. PATENT DOCUMENTS 6,684,198 B1 * 1/2004 Shimizu ............... G06Q 30/018
705/317
7,096,504 B1   8/2006 Tagawa et al.
(Continued)

FOREIGN PATENT DOCUMENTS

JP    2002-015147 A    1/2002
JP    2004-021755 A    1/2004
(Continued)

OTHER PUBLICATIONS

International Search Report issued May 29, 2012 in PCT/JP2012/060118.

*Primary Examiner* — Teshome Hailu
(74) *Attorney, Agent, or Firm* — Chip Law Group

(57) ABSTRACT

The present invention enables execution of predetermined content usage control processing without depending on a framework of a content playback program (application). Upon content playback processing, a flag which sets information of determination as to whether or not it is necessary to refer to a management information file such as a token or a usage control information file associated with content is recorded in a content file including encrypted content to be stored in a recording medium. Upon the content playback processing, a playback apparatus acquires the content file including the encrypted content stored in the recording medium, refers to a flag recorded in the content file and determines whether or not it is necessary to refer to the management information file based on a setting of the flag. When the setting of the flag indicates that it is necessary to refer to the management information file, it is possible to
(Continued)

select a correct management information file based on a content file identifier as a search key.

15 Claims, 22 Drawing Sheets

(51) Int. Cl.
  *G11B 20/00* (2006.01)
  *H04N 5/76* (2006.01)
  *H04L 29/06* (2006.01)
(52) U.S. Cl.
  CPC .... *G11B 20/00731* (2013.01); *H04L 63/0823* (2013.01); *H04N 5/76* (2013.01); *H04L 2463/101* (2013.01)
(58) Field of Classification Search
  USPC .......................................................... 726/27
  See application file for complete search history.

(56) References Cited

U.S. PATENT DOCUMENTS

| | | | |
|---|---|---|---|
| 8,270,811 B2 * | 9/2012 | Inokuchi | G11B 20/00086 386/200 |
| 2002/0133716 A1 * | 9/2002 | Harif | G07C 9/00103 726/9 |
| 2002/0165825 A1 * | 11/2002 | Matsushima | G06F 21/105 705/51 |
| 2004/0068631 A1 | 4/2004 | Ukeda et al. | |
| 2004/0190868 A1 | 9/2004 | Nakano et al. | |
| 2005/0289139 A1 * | 12/2005 | Takashima | G11B 20/00086 |
| 2009/0164801 A1 | 6/2009 | Kawahara | |
| 2010/0083386 A1 * | 4/2010 | Kline | G06F 21/33 726/34 |
| 2010/0218177 A1 * | 8/2010 | Miura | G06F 8/65 717/170 |

FOREIGN PATENT DOCUMENTS

| | | |
|---|---|---|
| JP | 2004-311000 A | 11/2004 |
| JP | 2005-166168 A | 6/2005 |
| JP | 2008-098765 A | 4/2008 |
| JP | 2010-263453 A | 11/2010 |
| JP | 2011-055310 A | 3/2011 |
| WO | WO 2007/058292 A1 | 5/2007 |

* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program. The present disclosure relates to an information processing apparatus, an information processing method and a program which, upon content playback processing in particular, enable execution of processing supported by a specific content protection system (CPS).

More specifically, the present disclosure relates to an information processing apparatus, an information processing method and a program which realize a configuration of executing predetermined processing such as processing of checking a content usage right according to the specific content protection system (CPS) without depending on, for example, a framework of a content playback program (application).

BACKGROUND ART

Lately, various media such as DVDs (Digital Versatile Disc), Blu-ray Discs (registered trademark) and flash memories are used as information recording media. Particularly, lately, use of memory cards such as USB memories on which large volume flash memories are mounted is becoming popular. A user can record content such as music or a movie in various information recording media, attach the media to a playback apparatus (player) and play back content.

However, creators or distributors hold copyrights and distribution rights of a great number of items of content such as music data and image data. Hence, when content is provided to the user, fixed usage control, that is, control to permit only a user who has a valid usage right to use content and prevent unregulated usage such as copy without permission is generally performed.

For example, an AACS (Advanced Access Content System) is known as a standard related to content usage control. The AACS standard defines a usage control configuration with respect to, for example, recorded content of a Blu-ray Disc (registered trademark). More specifically, the AACS standard defines, for example, an algorithm which can limit users who can acquire an encryption key of content to be recorded in a Blu-ray Disc (registered trademark) as encrypted content to a valid user.

The AACS defines managed copy (MC) which specifies a condition that copy permission information is acquired from a management server when, for example, content is copied between media.

Further, as processing of downloading content from a server, the AACS defines various downloads modes such as EST (Electric Sell Through) which uses a user apparatus such as a PC and MoD (Manufacturing on Demand) which uses a shared terminal installed at a convenience store, and sets an obligation to perform processing according to a predetermined rule even when content is recorded in a disk by each download processing and used.

In addition, these processing is disclosed in, for example, Patent Document 1 (Japanese Patent Application Laid-Open No. 2008-98765).

However, the present AACS defines a configuration of controlling usage of content recorded in a disk such as a Blu-ray Disc (registered trademark), and does not sufficiently define content to be recorded in other media such as a flash memory of a memory card.

Further, to playback content according to a content protection system (CPS) which is defined by the AACS, a playback apparatus needs to employ a configuration of executing a playback program (application) defined by the AACS.

However, a problem is that this playback program (application) defined by the AACS is a program which can be used only by a device having a specific specification, and is not a program which can be used by all devices.

For example, Android which provides an operating system (OS) function which is generally used by mobile terminals lately has difficulty in executing processing related to a content protection system (CPS) by means of the above application defined by the AACS.

For example, the content protection system (CPS) defined by the AACS employs a configuration of recording various independent files such as (a) a usage control information file (Usage File) which defines a content usage condition such as copy/playback control information and (b) a token (Token) which is a file in which data which is, for example, a content ID as a content identifier and which is used to check and verify playback content as files different from the content file in recording media of the content file in advance, acquiring these files before playback of content starts, checking a content usage right or verifying playback content.

To execute this processing, the current application defined by the AACS employs a configuration of specifying a directory and a file name of each file recorded in the media, individually reading the file and executing processing.

However, there is a problem that Android which provides the above operating system (OS) function does not permit an application to be executed on Android to specify a directory and a file name and individually read a file.

An apparatus which uses an operating system which has a limited function of executing this permitted application has a problem that the function of the existing content protection system (CPS) cannot be used.

When, for example, a media playback framework is pipeline-implemented as in an Android platform, a configuration of recording CPS data [a usage control information file (Usage File) or a token (Token)] in a medium as an individual file different from the content file has a problem that the CPS data cannot be easily taken by an application side.

Further, a normal media playback framework has a problem that, when a plurality of media is attached to one playback apparatus, an application cannot distinguish media.

CITATION LIST

Patent Document

Patent Document 1: JP 2008-98765 A

SUMMARY OF THE INVENTION

Problems to be Solved by the Invention

In view of, for example, the above problem, it is therefore an object of the present disclosure to provide an information processing apparatus, an information processing method and a program which realize a configuration of enabling execution of processing according to a specific content protection system (CPS) without depending on, for example, a framework of a playback program (application) of content.

Solutions to Problems

A first aspect of the present disclosure is an information processing apparatus which has a data processing unit which executes processing of reading data stored in a recording medium and playing back the data, and the data processing unit acquires a content file including encrypted content stored in the recording medium, and determines whether or not it is necessary to refer to a management information file based on a setting of a flag referring to the flag recorded in the content file, and when the setting of the flag indicates that it is necessary to refer to the management information file, executes processing of searching the management information file based on an identifier of the content file as a search key.

Further, according to one embodiment of the information processing apparatus of the present disclosure, the identifier of the content file is set to a file name of the management information file stored in the recording medium, and the data processing unit executes processing of selecting a management information file which has a file name to which an identifier identical to an identifier of a playback scheduled content file is set.

Furthermore, according to one embodiment of the information processing apparatus of the present disclosure, the management information file stored in the recording medium is set to a directory which has a directory name including the identifier of the content file, and the data processing unit executes processing of selecting a management information file which is set to a directory to which an identifier identical to an identifier of a playback scheduled content file is set.

Still further, according to one embodiment of the information processing apparatus of the present disclosure, the data processing unit executes processing of searching a management information file based on a content file identifier recorded in the content file as the search key.

Moreover, according to one embodiment of the information processing apparatus of the present disclosure, the data processing unit calculates a verification value based on an identifier (medium ID) of the recording medium, executes processing of matching the verification value and a verification value recorded in the recording medium, and performs processing of playing back the encrypted content on a condition that a match is found.

Moreover, according to one embodiment of the information processing apparatus of the present disclosure, the data processing unit outputs a certificate of the information processing apparatus to the recording medium, reads an encryption key from a protected area on a condition of permission determination as to an access right to the protected area of the recording medium based on verification of the certificate in the recording medium, and executes content decoding/playback processing to which the encryption key is applied.

Further, a second aspect of the present disclosure is an information processing apparatus which has a data processing unit which executes processing of reading data stored in a recording medium and playing back the data, and the data processing unit acquires a content file including encrypted content stored in the recording medium, and determines whether or not it is necessary to refer to a management information file based on a setting of a flag referring to the flag recorded in the content file, and when the setting of the flag indicates that it is necessary to refer to the management information file, executes processing of referring to the management information file stored in the content file.

Furthermore, a third aspect of the present disclosure is an information processing apparatus which has a data processing unit which executes processing of recording data in a recording medium, and the data processing unit records a content file including encrypted content in the recording medium, sets to the content file a flag indicating whether or not it is necessary to refer to a management information file upon processing of playing back the encrypted content, and records a management information file which has a file name including a content file identifier or a management information file under a directory which has a directory name including the content file identifier.

Still further, according to one embodiment of the information processing apparatus of the present disclosure, the data processing unit calculates a verification value based on an identifier (medium ID) of the recording medium and records the calculated verification value in the recording medium.

Moreover, a fourth aspect of the present disclosure is an information recording medium which has as recorded data a content file including encrypted content which is a playback target in a playback apparatus, and stores in the content file a flag indicating whether or not it is necessary to refer to a management information file upon processing of playing back the encrypted content, and upon content playback processing in the playback apparatus, enables execution of determination as to whether or not it is necessary to refer to the management information file based on a setting of the flag.

Further, according to one embodiment of the information recording medium of the present disclosure, the information recording medium further stores as recorded data a verification value based on an identifier (medium ID) of the information recording medium, and upon the content playback processing in the playback apparatus, enables the playback apparatus to calculate the verification value based on the identifier (medium ID) of the information recording medium, execute processing of matching the calculated verification value and a recorded verification value, and perform permission determination processing of content playback according to a matching result.

Furthermore, a fifth aspect of the present disclosure is an information processing method which is executed in an information processing apparatus, and the information processing apparatus has a data processing unit which executes processing of reading data stored in a recording medium and playing back the data and the data processing unit acquires a content file including encrypted content stored in the recording medium, and determines whether or not it is necessary to refer to a management information file based on a setting of a flag referring to the flag recorded in the content file, and when the setting of the flag indicates that it is necessary to refer to the management information file, executes processing of searching the management information file based on an identifier of the content file as a search key.

Furthermore, a sixth aspect of the present disclosure is an information processing method which is executed in an information processing apparatus, and the information processing apparatus has a data processing unit which executes processing of recording data in a recording medium and the data processing unit records a content file including encrypted content in the recording medium, sets to the content file a flag indicating whether or not it is necessary to refer to a management information file upon processing of playing back the encrypted content, and records a management information file which has a file name including a content file identifier or a management information file under a directory which has a directory name including the content file identifier.

Still further, a seventh aspect of the present disclosure is a program which causes an information processing apparatus to execute information processing, and the information processing apparatus has a data processing unit which executes processing of reading data stored in a recording medium and playing back the data and the program causes the data processing unit to execute:

processing of acquiring a content file including encrypted content stored in the recording medium, and determining whether or not it is necessary to refer to a management information file based on a setting of a flag referring to the flag recorded in the content file; and processing of, when the setting of the flag indicates that it is necessary to refer to the management information file, searching the management information file based on an identifier of the content file as a search key.

Moreover, an eighth aspect of the present disclosure is a program which causes an information processing apparatus to execute information processing, and the information processing apparatus has a data processing unit which executes processing of recording data in a recording medium and the program causes the data processing unit to execute:

processing of recording a content file including encrypted content in the recording medium;

processing of setting to the content file a flag indicating whether or not it is necessary to refer to a management information file upon processing of playing back the encrypted content; and processing of recording a management information file which has a file name including a content file identifier or a management information file under a directory which has a directory name including the content file identifier.

In addition, the program according to the present disclosure is a program which can be provided in a computer-readable format to an information processing apparatus or a computer system which can execute various program codes through a recording medium or a communication medium. By providing this program in a computer-readable format, processing corresponding to the program is realized on the information processing apparatus or the computer system.

Other objects, features and advantages of the present disclosure will be made obvious from the detailed description based on the embodiment of the present disclosure described below and the accompanying drawings. In addition, the system in this description refers to a logical set configuration of a plurality of apparatuses, and is not limited to a configuration in which apparatuses employing each configuration are provided in a single housing.

Effects of the Invention

A configuration according to one embodiment of the present disclosure can execute predetermined content usage control processing without depending on a framework of a content playback program (application).

More specifically, upon content playback processing, a flag to which information of determination as to whether or not it is necessary to refer to a management information file such as a token or a usage control information file associated with content is set is recorded in a content file including encrypted content stored in a recording medium.

According to the present configuration, upon content playback processing, a playback apparatus can acquire a content file including encrypted content stored in a recording medium, refer to a flag recorded in the content file and determine whether or not it is necessary to refer to a management information file based on a setting of the flag. Further, when the setting of the flag indicates that it is necessary to refer to the management information file, the playback apparatus can select the correct management information file based on a content file identifier as a search key.

MODE FOR CARRYING OUT THE INVENTION

An information processing apparatus, an information processing method, and a program according to the present disclosure will be described in detail below with reference to the drawings. In addition, the present embodiment will be described in the following order.

1. Outline of Content Providing Processing and Usage Processing
2. Recording Configuration Example 1 of Content and Management Information (First Embodiment)
3. Example of Content Playback Processing Supported by Data Recording Configuration according to First Embodiment
4. Configuration Example of Memory Card
5. Certificate Having Permission Information of Access to Protected Area
6. Example of Processing of Accessing Memory Card to which Certificate of Each Apparatus is Applied
7. Example of Content Recording Processing Supported by Data Recording Configuration according to First Embodiment
8. Recording Configuration Example 2 of Content and Management Information (Second Embodiment)
9. Example of Content Playback Processing Supported by Data Recording Configuration according to Second Embodiment
10. Example of Content Recording Processing Supported by Data Recording Configuration according to Second Embodiment
11. Recording Configuration Example 3 of Content and Management Information (Third Embodiment)
12. Example of Content Playback Processing Supported by Data Recording Configuration according to Third Embodiment
13. Example of Content Recording Processing Supported by Data Recording Configuration according to Third Embodiment
14. Hardware Configuration Example of Each Apparatus
15. Conclusion of Configuration of Present Disclosure

1. Outline of Content Providing Processing and Usage Processing

An information processing apparatus, an information processing method, and a program according to the present invention will be described in detail below with reference to the drawings.

First, an outline of an example of content providing processing and usage processing will be described with reference to FIG. 1.

Figure 1:
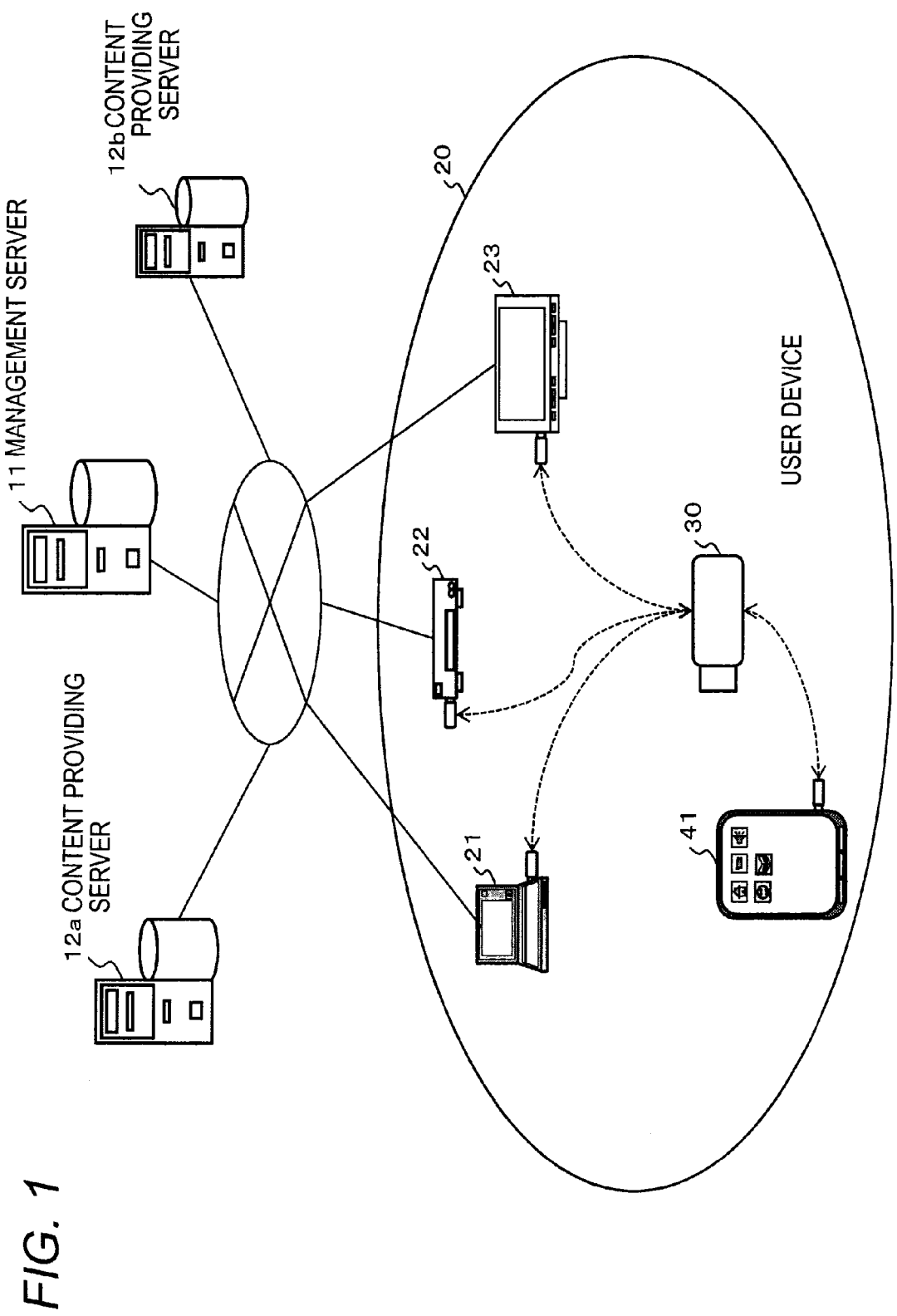
FIG. 1 is a view for explaining an outline of content providing processing and usage processing.

FIG. 1 illustrates user devices 20 which execute processing of playing back or recording content such as a movie or content. The user devices 20 include a PC 21, a playback apparatus 22 and a television 23 which perform processing of playing back and recording content. The user devices further include, for example, a memory card 30 such as a flash memory which records content recorded in recording media of the PC 21, the playback apparatus 22 and the television 23 such as hard disks and outputted from these devices, and a playback apparatus 41 to which the memory card 30 is attached and which plays back content recorded in the memory card.

The PC 21, the playback apparatus 22 and the television 23 as the user devices 20 acquire various items of content from content providing servers 12a and 12b, and record the data in the recording media such as the hard disks of these devices. Further, the PC, the playback apparatus and the television acquire key information which is necessary to use these items of content, from the management server 11.

A user uses content in the PC 21, the playback apparatus 22 and the television 23 in many modes of, for example, playing back the content acquired from the content providing servers 12a and 12b and outputting the content to an external device. In addition, in many cases, content provided from the content providing servers 12a and 12b is usage control target content.

The content providing servers 12a and 12b provide usage control content to provide to the user devices 20 and, in addition, a usage control information file (Usage File) in which a permissible content usage mode such as limitation information related to playback processing or copy processing is recorded, to the user devices 20. The user devices 20 use content within a range permitted by this usage control information file (Usage File).

Data to be provided from the content providing servers 12a and 12b to the user devices 20 as a management information file associated with usage control content includes, for example, the following data.

The user devices 20 such as the PC 21, the playback apparatus 22 and the television 23 receive files such as (a) a usage control information file (Usage File) which defines a content usage condition such as copy/playback control information and (b) a token (Token) which is a file in which data which is, for example, a content ID as a content identifier and which is used to check and verify playback content is stored, from the content providing servers 12a and 12b together with the content file.

However, as described above, when the user devices 20 record these management information files as files which are independently different from a content file, in recording media such as the hard disks, the above-described problem occurs in some cases depending on the user devices.

A device in which the operating system (OS) set to the user devices 20 permits processing of specifying a directory and a file name and individually reading a file can perform processing (for example, processing defined by the AACS) of individually reading these management information files and executing processing of checking a content usage right according to a predetermined sequence, determining whether or not content can be used and using the content.

However, when these devices have an operating system (OS) which does not permit processing of specifying a directory and a file name as in above Android and individually reading a file, smoothly reading management information files such as the above usage control information file (Usage File) and token (Token) is blocked. As a result, in some cases, it is not possible to perform usage control processing which complies with the definition of, for example, processing (for example, processing defined by the AACS) of checking a content usage right based on these management information files and processing of determining whether or not content can be used.

In addition, this problem is likely to occur when a device such as the playback apparatus 41 in particular illustrated in FIG. 1 does not directly acquire content from, for example, the content providing servers 12a and 12b.

The PC 21, the playback apparatus 22 and the television 23 as the user devices 20 illustrated in FIG. 1 usually execute processing of acquiring content from the content providing servers 12a and 12b after checking that the devices (for example, domain devices) are registered in the management server 11 which has a content usage right, and check that the devices can execute a content playback sequence which includes checking content according to, for example, the definition of the AACS.

In addition, the domain device is a device for which a content usage right is authorized and is a device which is registered in the management server 11. The domain device is, for example, a device which acquires key data which is applied to, for example, processing of decoding encrypted content, from the management server 11. More specifically, the domain device is a device which uses content according to marlin digital rights management (Marlin DRM) which is a definition of usage control of digital content defined by manufacturing companies such as Sony Corporation.

Meanwhile, a device such as the playback apparatus 41 which is illustrated in, for example, FIG. 1 and which does not directly acquire content from the content providing server 12 does not check functions of the playback apparatus 41 upon acquisition of content, and causes the above problem in some cases depending on a function of the playback apparatus 41.

More specifically, for example, content files and management information files stored in the PC 21, the playback apparatus 22 and the television 23 as the user devices 20 are recorded in the memory card 30 such as a flash memory, and the playback apparatus 41 which plays back the content stored in the memory card 30 is played back.

When the playback apparatus 41 is a device which has the operating system (OS) like above-described Android which does not permit processing of specifying a directory and a file name and individually reading files, the above problem occurs.

A configuration example of solving this problem will be described below.

2. Recording Configuration Example 1 of Content and Management Information

First Embodiment

A recording configuration example 1 of content and management information according to the present disclosure (first embodiment) will be described with reference to FIG. 2.

Figure 2:
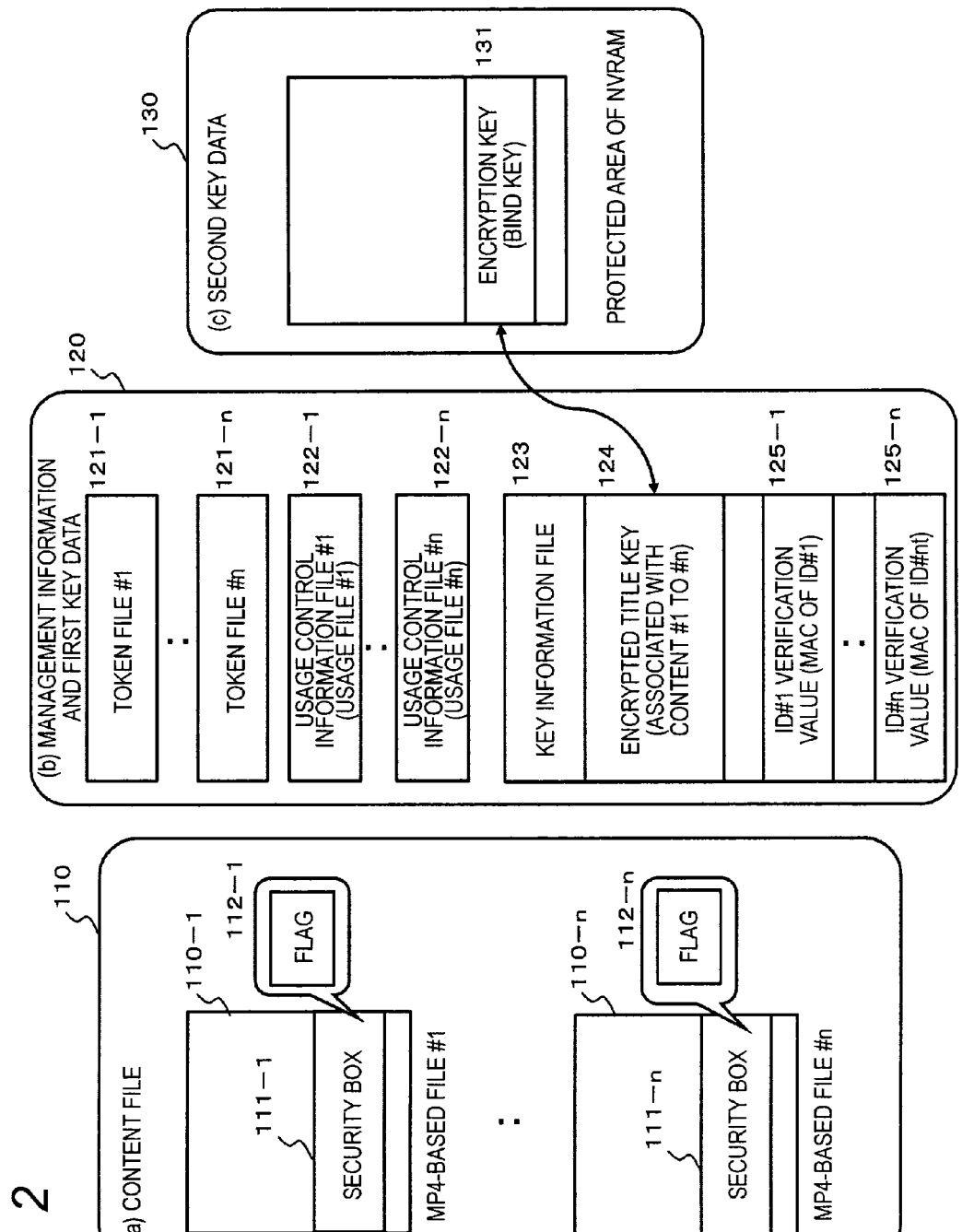
FIG. 2 is a view illustrating an example of a configuration of recording data in a medium.

FIG. 2 is a view illustrating a data recording configuration of a medium (recording medium) and, more specifically, a recording configuration example of each data such as a content file, a management information file and key information used upon content playback processing.

The medium (recording medium) is, for example, the memory card 30 illustrated in FIG. 1 or recording media provided in the PC 21, the playback apparatus 22, the television 23 and the playback apparatus 41.

Data recording processing according to the medium recording configuration illustrated in FIG. 2 is performed upon data recording processing performed at, for example, a following timing.

(1) The PC 21, the playback apparatus 22, the television 23 and the playback apparatus 41 as the user devices 20 perform processing of recording data acquired from the content providing servers 12a and 12b, in the memory card 30.

Alternatively, (2) The PC 21, the playback apparatus 22, the television 23 and the playback apparatus 41 as the user devices 20 perform processing of recording data acquired from the content providing servers 12a and 12b, in the recording medium such as the hard disk of these devices.

For example, the data recording configuration illustrated in FIG. 2 is a configuration set by the above data recording processing (1) and (2).

An example of executing the above data recording processing (1), that is, a processing example of performing recording according to the data recording configuration illustrated in FIG. 2 when the PC 21, the playback apparatus 22, the television 23 and the playback apparatus 41 as the user devices 20 record data acquired from the content providing servers 12a and 12b, in the memory card 30 will be described below.

A processing example in case that the memory card 30 is attached to the PC 21 of the user devices 20 illustrated in FIG. 2 to record data in the memory card 30 will be described as a specific example.

The PC 21 records in the memory card 30 each data such as a content file, a management information file and key information acquired from the content providing server 12 and recorded in the hard disk of the PC 21. In this case, data is recorded according to the recording configuration illustrated in FIG. 2.

As illustrated in FIG. 2, in the memory card 30, each data such as (a) a content file 110,
(b) management information and first key data 120 and
(c) second key data 130
is recorded.

FIG. 2 illustrates an example where
n content file #1 110-1 to content file #n 110-n are recorded as (a) the content file 110.

These content files are, for example, encoded data files of an MP4 format, and are data files including encrypted content obtained by encrypting playback target data such as movie or music.

In each of the content file #1 110-1 to the content file #n 110-n, security boxes 111-1 to n in which flags 112-1 to n which indicate an attribute of content included in a content file are recorded in addition to the encrypted content.

A flag is a flag including information as to whether or not it is necessary to refer to a management information file upon use of content.

Further, for example, a flag which has information indicating a type of a content usage control system (DRM: Digital Rights Management) such as a DRM type such as Marlin may be set.

A setting of a flag includes, for example, flag value=0: it is not necessary to perform processing referring to a management information file, flag value=1: it is necessary to perform processing referring to a management information file, or flag value=00: it is not necessary to perform processing referring to a management information file, flag value=01: content usage control system (DRM)=marlin (Marlin) holds and it is necessary to perform processing referring to a management information file, and flag value=02: content usage control system (DRM)= xxxx holds and it is necessary to perform processing referring to a management information file.

Upon, for example, content playback processing in a playback apparatus, the content playback program (application) executed on the OS such as above Android reads and plays back a content file 110-x. In this case, the playback apparatus acquires a security box included in the read content file 110-x, refers to a flag value and determines based on the flag value whether or not it is necessary to read a management information file and process data based on the management information file.

In addition, to smoothly execute this processing, data in the security box is preferably unencrypted data.

(b) The management information and the first key data 120 illustrated in FIG. 2 include a management information file and a key information file associated with each of the content file #1 110-1 to the content file #n 110-n.

The management information file includes the following files.

The management information file includes files including token files (Token File) 121-1 to 121-n which are files in which data which is a content ID as a content identifier and is used to check and verify playback content is stored, and a usage control information file (Usage File) 122-1 to n which define a content usage condition such as copy/playback control information.

A specific data configuration example of the token file (Token File) 121 will be described with reference to FIG. 3.

Figure 3:
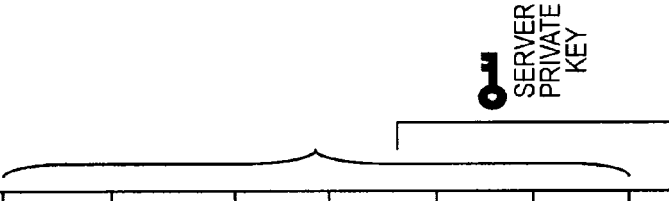
FIG. 3 is a view for explaining a specific data configuration example of a token.

The token is data including, for example, the following data as illustrated in FIG. 3.

(1) Volume ID (PV Volume ID)
(2) Content ID (Content ID)
(3) Content Hash Table Digest (Content Hash Table Digest(S))
(4) Usage Control Information Hash Value (Usage Rule Hash)
(5) Time Stamp (Time stamp)
(6) Other Information
(7) Signature (Signature)

Each of the above data will be described below.

(1) Volume ID (PV Volume ID)

The volume ID (PV Volume ID) is an identifier (ID) associated with content in predetermined units (for example, title units). This ID is data which is likely to be referred to by BD-J/API or BD+API which is a Java (registered trademark) application which is likely to be used upon playback of content.

(2) Content ID (Content ID)

Although the content ID (Content ID) is an identifier which identifies content, the content ID recorded in a token is set as data including an ID of a server which provides content or content management data (including a token). That is, content ID=server ID (Server ID)+unique content ID (Unique Content ID) holds.

The content ID is recorded as data including the server ID as described above.

The server ID is an ID which a certificate authority sets to each content providing server. The server ID is the same as a server ID recorded in a server certificate (Server Cert) explained above with reference to FIG. 4.

The unique content ID is an identifier (ID) associated with content which the content providing server uniquely sets.

The content ID recorded in the token is configured as a combination of the server ID set by the certificate authority in this way and the unique content ID set by the content providing server.

In addition, the number of constituent bits of the content ID, the number of bits of the server ID and the number of bits of the unique content ID are defined in advance, and the playback apparatus which plays back content can acquire the server ID by acquiring upper bits of the predetermined number of bits from the content ID recorded in the token and acquire the unique content ID by acquiring predetermined lower bits from the content ID.

(3) Content Hash Table Digest (Content Hash Table Digest(S))

A content hash table digest (Content Hash Table Digest (S)) is data in which a hash value of content stored in the memory card is recorded. This data is used for processing of verifying falsification of content.

The playback apparatus which plays back content calculates a hash value of playback scheduled content which is recorded in the memory card, and compares the hash value and a record value of the content hash table digest (Content Hash Table Digest(S)) recorded in the token. When calculated data and registered data match, it is determined that content is not falsified and it is possible to play back content. When a match is not found, it is determined that there is a probability that content is falsified and playback is forbidden.

(4) Usage Control Information Hash Value (Usage Rule Hash)

The usage control information hash value (Usage Rule Hash) is a hash value of usage control information which the server provides to the user as management data of content and records in the memory card.

Usage control information is data in which permission information of a usage mode of content such as whether or not to permit copy of content, the number of permissible times of copy and whether or not content can be outputted to other devices, and is information recorded in the memory card together with content.

The usage control information hash value is a hash value used as data to verify falsification of this usage control information.

The playback apparatus which plays back content calculates a hash value of usage control information associated with playback scheduled content which is recorded in the memory card, and compares the hash value and a record value of the usage control information hash value (Usage Rule Hash) recorded in the token. When calculated data and registered data match, it is determined that usage control information is not falsified and it is possible to use content according to usage control information. When a match is not found, it is determined that there is probability that usage control information is falsified and usage processing such as playback of content is forbidden.

(5) Time Stamp (Time Stamp)

The time stamp (Time stamp) is a token creation date such as creation date information of a signature indicated in (7) in FIG. 3.

In the token (Token), [(6) other information] is recorded as illustrated in FIG. 3 and (7) the signature (Signature) generated by a private key of the server for each data of (1) to (6) is further recorded in addition to the above data. This signature realizes a configuration of preventing falsification of a token.

When the token (Token) is used, the signature is verified, it is checked that the token (Token) is not falsified and is valid, and is used. In addition, the signature is verified using a public key of the server. The public key of the server can be acquired from, for example, a public key certificate of a server (Server Certificate).

Back to FIG. 2, data to be stored in the memory card 30 will be described again.

(b) The management information and the first key data 120 illustrated in FIG. 2 include a token file 121 and a usage control information file 122 and, in addition, a key information file 123.

The key information file 123 stores data of an encrypted title key 124 obtained by encrypting a title key which is a key which is applied to processing of encrypting and decoding encrypted content stored in each of the content file #1 110-1 to the content file #n 110-n and verification values 125-1 to n (MAC: Message Authentication Code) based on coupling information of a content file identifier and a device or medium identifier (the memory card 30 identifier illustrated in FIG. 1 in this example).

In addition, this example assumes that a device which stores data illustrated in FIG. 2 is the memory card 30, and the verification values 125-1 to n are set as verification values (MAC) based on coupling information of the content file identifier and the memory card 30 identifier.

In addition, a verification value (MAC) is set as a verification value (MAC) based on an identifier (device ID) of a device which stores data employing the configuration illustrated in FIG. 2 or a medium identifier (medium ID).

To each file of the token files (Token File) 121-1 to 121-n which are management information files and the usage control information files (Usage File) 122-1 to n, content file identification information (#1 to #n) is set as a file name.

According to this file name setting processing, a content playback execution program (application) which is executed in a playback apparatus which plays back content can select a management information file which has the same identifier based on a playback scheduled content file identifier (#1 to #n) as a search key. According to this file selection processing, it is possible to correctly select the management information file associated with the playback scheduled content.

In addition, a configuration of setting the content file identifier (#1 to #n) to the file name of the management information file may be employed and, in addition, a configuration of setting the content file identifier (#1 to #n) to a directory name which sets the management information file may be employed.

In case of this configuration, the playback apparatus can select a directory which has the same identifier based on the playback scheduled content file identifier (#1 to #n) as a search key, and acquire the management information file associated with the playback scheduled content, from this selected directory.

Further, the content playback execution program (application) which is executed by a playback apparatus which plays back content acquires a verification value (ID#x verification value) 125-x associated with the playback scheduled content file which is included in the key information file 123, and executes verification processing based on the acquired verification value.

More specifically, when, for example, the data illustrated in FIG. 2 is recorded in the memory card 30 illustrated in FIG. 1 and the playback apparatus 41 illustrated in FIG. 1 is attached the memory card 30 and plays back content included in the content file 110-x, the playback apparatus 41 acquires the memory card 30 identifier (medium ID) and calculates a MAC based on the acquired medium ID and the identifier (ID#x) of the playback scheduled content file. Further, processing of matching the calculated MAC and the verification value (ID#x verification value) 125-x included in the key information file 123 is executed.

In this match processing, when a match is found (both of MACs match), it is determined that content is stored in a medium according to valid processing, and the flow proceeds to playback of content.

Meanwhile, when a match is not found (both of MACs do not match), it is determined that content is not stored in a medium according to valid processing and, for example, there is a probability that copy is invalidly performed between media. In this case, content is not played back.

As illustrated in FIG. 2, (c) the second key data 130 is further recorded in the memory card 30.

More specifically, this is a bind key 131 as illustrated in FIG. 2. The bind key 131 is an encryption key of the encrypted title key 124.

The bind key 131 is recorded in a protected area (Protected Area) of the memory card. In addition, the protected area (Protected Area) is an access limited area, and is an area which the access request apparatus is permitted to access according to access permission information described in a certificate by verifying the certificate presented to the memory card. A configuration of this protected area and an access sequence will be described in detail below.

When, for example, the playback apparatus 41 illustrated in FIG. 1 is attached the memory card 30 and plays back content recorded in the content file 110-x stored in the memory card 30, the playback apparatus 41 outputs the certificate (for example, a public key certificate) of the playback apparatus to the memory card 30.

The memory card 30 verifies the certificate of the playback apparatus 41, and determines whether or not to permit an access to the protected area (Protected Area) according to the access permission information described in the certificate.

When it is determined that the access is permitted, the playback apparatus 41 can read the bind key 131 from the protected area (Protected Area) of the memory card 30.

An encrypted title key is decoded by using the read bind key 131 to acquire a title key, and encrypted content included in the content file 110-x is decoded using the acquired title key to perform playback.

3. Example of Content Playback Processing Supported by Data Recording Configuration According to First Embodiment Next, a playback sequence in case that the playback apparatus executes processing of reading and playing back content recorded in a medium employing a data recording configuration described with reference to FIG. 2 will be described with reference to the flowcharts illustrated in FIG. 4 and subsequent drawings.

Figure 4:
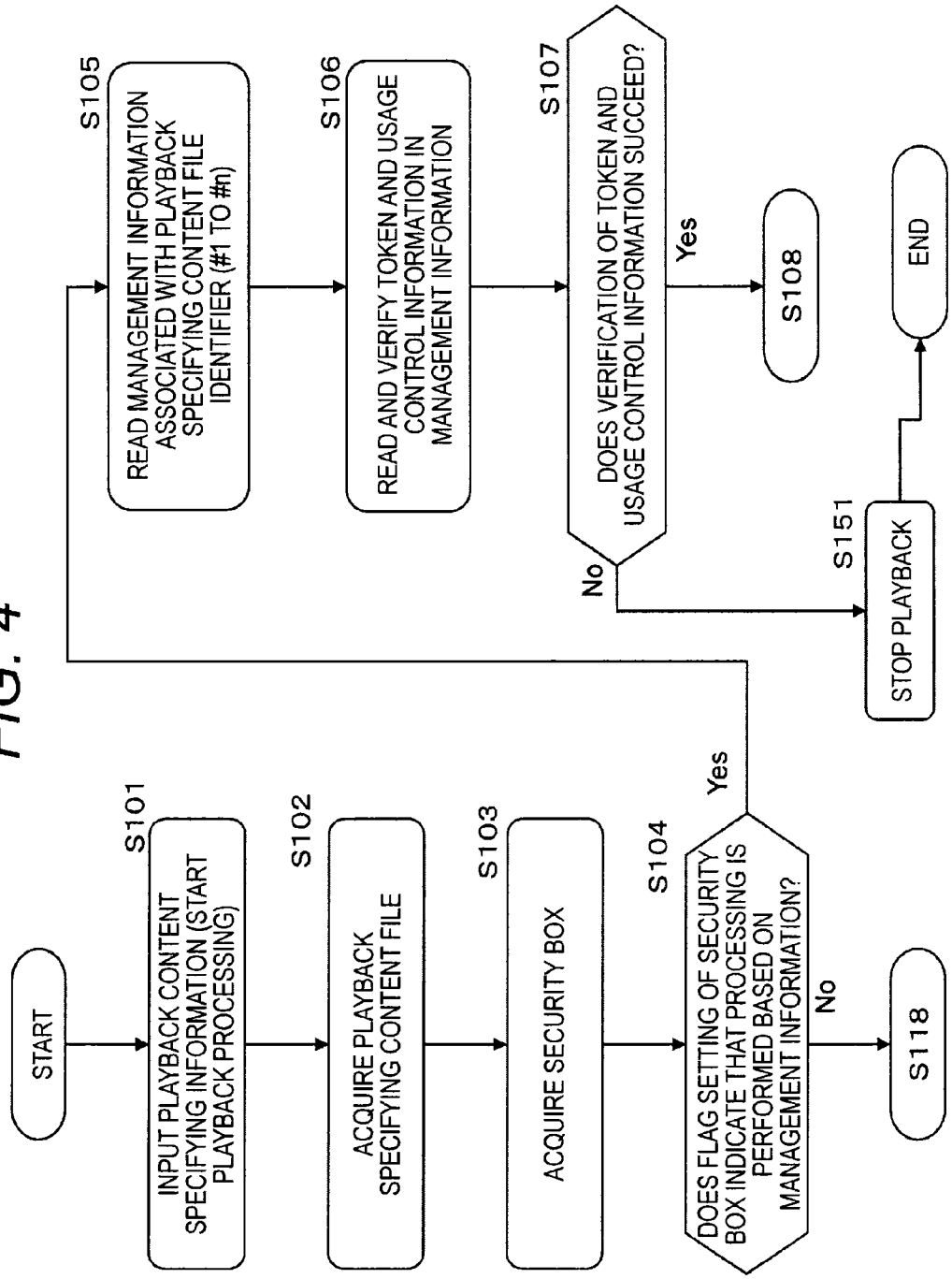
FIG. 4 is a view illustrating a flowchart for explaining a content playback processing sequence.
Figure 5:
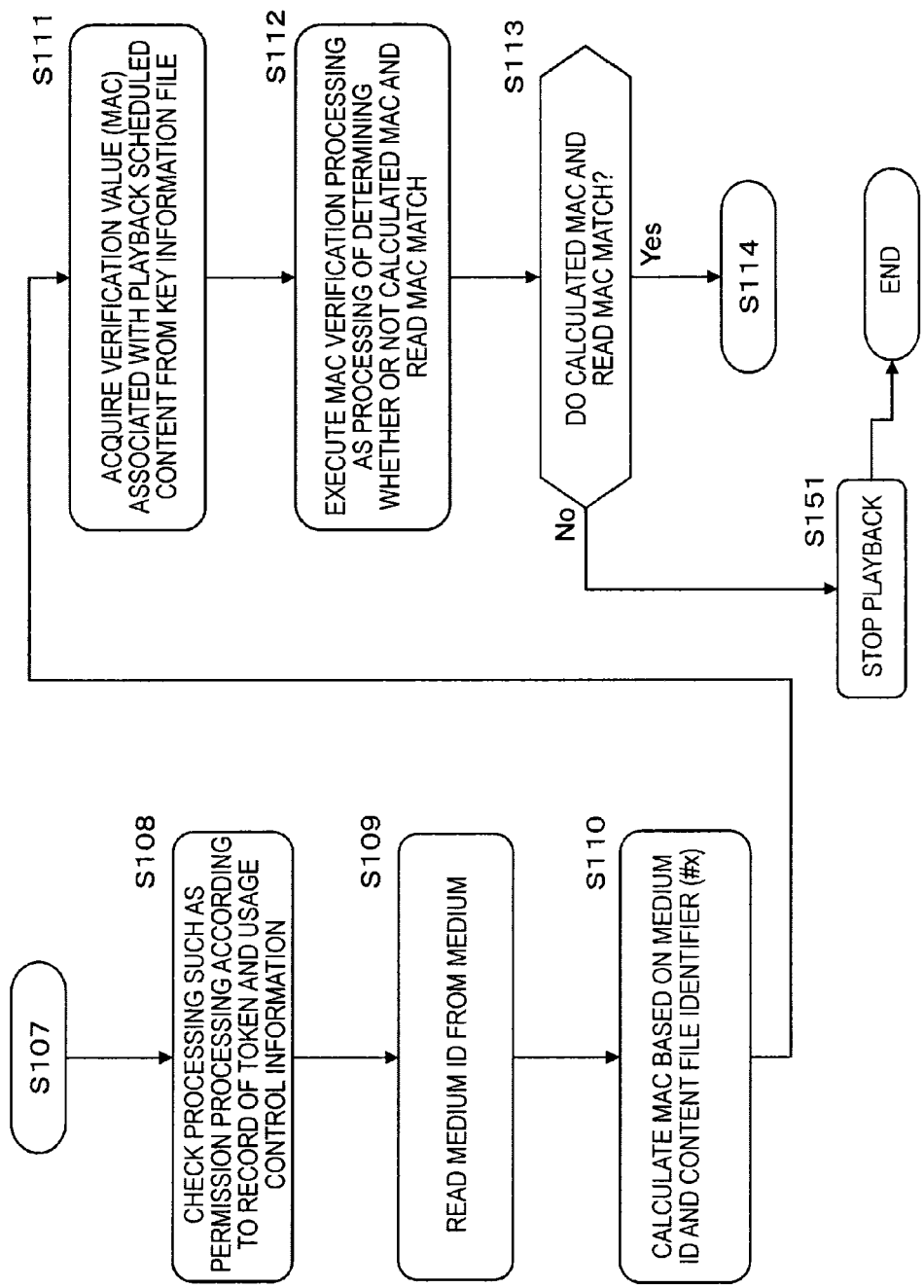
FIG. 5 is a view illustrating a flowchart for explaining a content playback processing sequence.

The content playback processing according to the flowchart in FIG. 4 and subsequent drawings is executed by the playback apparatus which executes processing of reading, for example, a content file from a medium which stores data illustrated in FIG. 2 and playing back the content file.

The content playback processing is, for example, processing executed when the playback apparatus 41 illustrated in FIG. 1 is attached the memory card 30 which stores data illustrated in FIG. 2 and reads and plays back a content file stored in the memory card 30.

In addition, content playback processing in the playback apparatus 41 is performed when a data processing unit of the playback apparatus 41 executes a playback program (application) stored in the memory of the playback apparatus 41 in advance, and processing in each step indicated in the flowcharts in FIG. 4 and subsequent drawings is executed by the data processing unit of the playback apparatus 41.

Processing in each step indicated in the flows in FIG. 4 and the subsequence drawings will be described.

First, in step S101, a playback sequence is started by inputting playback content specifying information.

Processing in step S101 is more specifically performed as processing of detecting an input of content specifying information from the user for, for example, content information which is displayed on a display of the playback apparatus 41 and can be played back.

Next, in step S102, a playback specified content file is acquired. For example, a content file recorded in the memory card 30 attached to the playback apparatus 41 is acquired.

More specifically, for example, the data processing unit of the playback apparatus 41 performs processing of reading the content file #1 110-1 illustrated in FIG. 2 from the memory card 30.

Next, in step S103, a security box is acquired from the read content file.

As described above with reference to FIG. 2, in the security box included in the content file, a flag (flag) which indicates an attribute of content included in the content file is recorded.

The flag has, for example, information as to whether or not it is necessary to refer to a management information file upon use of content.

For example, a setting includes flag value=0: it is not necessary to perform processing referring to a management information file and flag value=1: it is necessary to perform processing referring to a management information file.

In step S104, the playback apparatus determines whether or not the flag value of the security box indicates that it is necessary to perform processing of referring to a management information file.

When the flag value indicates that it is necessary to perform processing of referring to the management information file, the flow proceeds to step S105.

When the flag value indicates that it is not necessary to perform processing of referring to the management information file, the flow proceeds to step S118 and proceeds to playback of content. This is processing performed with respect to content for which use control is unnecessary such as service content, and is processing in case that content is content which is not encrypted and which can be freely used. In this case, processing in steps S105 to S117 is skipped and the flow proceeds to playback of content included in a content file.

When the flag indicates that it is necessary to perform processing of referring to a management information file, the flow proceeds to step S105 to read a management information file.

Upon processing of reading this management information file, the management information file is searched based on a playback specified content identifier (#x) as a search key. That is, a management information file which has the same identifier as the playback scheduled content file identifier (#1 to #n) in a management information file name is selected. According to this file selection processing, it is possible to correctly select the management information file associated with the playback scheduled content.

In addition, as described above, a configuration of setting the content file identifier (#1 to #n) to a directory name to which the management information file is set may be employed, and, in this case, a directory which has the same identifier as the content file identifier (#1 to #n) is selected and the management information file set to this directory is selected. According to this file selection processing, it is possible to correctly select the management information file associated with the playback scheduled content.

Next, in step S106, the playback apparatus reads a token and usage control information which are management information files associated with playback scheduled content, and verifies a signature for verifying falsification set to these items of data.

When it is determined in step S107 that verification succeeds, the flow proceeds to step S108 and, when verification does not succeed, the flow proceeds to step S151 and playback processing is stopped.

When it is determined in step S107 that verification succeeds and validity of the token and usage control information is checked, the flow proceeds to step S108 and content based on constituent data of the token and the usage control information is verified or permission processing is checked.

Next, in step S109, the playback apparatus reads a medium ID which is an identifier of the memory card which stores a content file.

Next, in step S110, the playback apparatus calculates a verification value (for example, MAC) based on the read medium ID and the playback scheduled content file identifier (#x). In addition, this calculating algorithm is an algorithm determined in advance, and the same algorithm as an algorithm of calculating a MAC stored in the key information file 123 described above with reference to FIG. 2 is applied.

Next, in step S111, the playback apparatus acquires a verification value (MAC) stored in the key information file 123 described with reference to FIG. 2 and, in step S112, the playback apparatus executes processing (MAC verification) of matching the calculated MAC value and the verification value (MAC) stored in the key information file 123.

In step S113, when it is determined that the calculated MAC and the read MAC match, it is determined that a medium is subjected to valid content writing processing and processing in steps subsequent to step S114 is executed.

In step S113, when it is determined that the calculated MAC and the read MAC do not match, it is determined that there is a probability that a medium is not subjected to valid content writing processing and the flow proceeds to step S151 to stop processing without executing processing in steps subsequent to step S114.

When the calculated MAC and the read MAC match in step S113 and the flow proceeds to step S114, the playback apparatus reads an encryption key (bind key) recorded in a protected area of the memory card.

In addition, as a precondition of an access to this protected area, the playback apparatus presents a certificate (for example, a public key certificate) of the playback apparatus to the memory card. Only when the memory card determines whether or not there is an access right to the protected area based on the certificate received from the playback apparatus, and authorizes the access right, processing of reading a bind key from the protected area in step S114 is executed.

When the access right is not authorized, the processing in step S114 is not executed and playback of content is not permitted.

When the access right to the protected area of the memory card of the playback apparatus is checked and processing of reading the bind key from the protected area in step S114 is executed, in step S115, the playback apparatus then reads an encrypted title key associated with playback scheduled content from the encryption key file 123 illustrated in FIG. 2.

Next, in step S116, the playback apparatus executes processing of decoding the encrypted title key using the bind key and acquires a title key.

Further, in step S117, processing of decoding encrypted content in a playback scheduled content file by using the acquired title key is executed, and, in step S118, the decoded content is played back.

4. Configuration Example of Memory Card

As described above, to a medium such as the memory card 30 such as a flash memory, a protected area to which an access is permitted based on the checked access right is set.

A configuration example of a medium to which the protected area is set will be described with reference to FIG. 7 and subsequent drawings.

Figure 7:
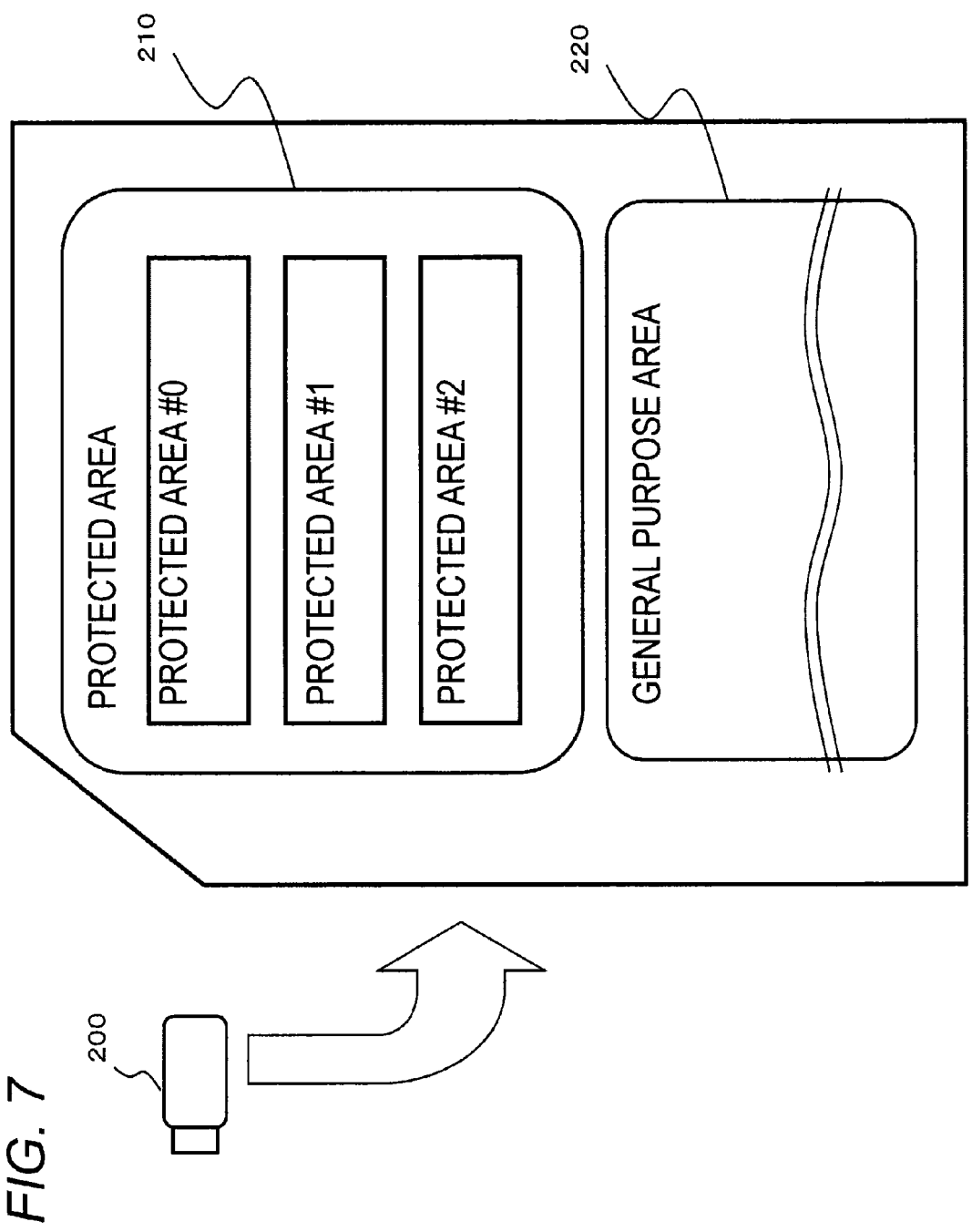
FIG. 7 is a view for explaining a specific configuration example of a storage area of a memory card.

FIG. 7 is a view illustrating a specific configuration example of a memory card such as a flash memory used as a recording medium of content.

As illustrated in FIG. 7, the storage area of the memory card 200 is formed with two areas of (a) a protected area (Protected Area) 210 and (b) a general purpose area (General Purpose Area) 220.

(b) The general purpose area (General Purpose Area) 220 is an area which a recording apparatus or a playback apparatus used by the user can freely access, and in which content or general content management data is recorded. The general purpose area is an area in which the user can freely write and read data.

Meanwhile, (a) the protected area (Protected Area) 210 is an area to which a free access is not permitted.

When, for example, the recording apparatus or the playback apparatus used by the user or a server connected through a network writes or reads data, the data processing unit of the memory card 200 executes access permission determination processing according to the program stored in advance in the memory card 200. According to this determination processing, whether or not each apparatus which requests an access is permitted to read (Read) or write (Write) data is determined.

The memory card 200 has a data processing unit which executes a program stored in advance and performs authentication processing, and the memory card 200 performs processing of authenticating a device which writes or reads data in and from the memory card 200.

At a stage of this authentication processing, an apparatus certificate (for example, a server certificate (Server Certificate)) such as a public key certificate is received from an apparatus of another party, that is, an access request apparatus, and whether or not to permit an access to each partitioned area of the protected area (Protected Area) 210 is determined using information described in this certificate. This determination processing is performed in units of partitioned areas (areas #0, #1, #2 and ... illustrated in the drawing) in the protected area (Protected Area) 210 illustrated in FIG. 7, and only processing (processing of, for example, reading/writing data) which is permitted in the permitted partitioned area is set as permission processing with respect to the access request apparatus.

Read/write limitation information (PAD Read/PAD Write) with respect to this medium is set in, for example, units of an apparatus which requests an access such as a server or a recording/playback apparatus (host). These pieces of information are recorded in a server certificate (Server Certificate) and a host certificate (Host Certificate) associated with each apparatus.

The memory card 200 performs processing of verifying recorded data of the server certificate (Server Certificate) or a host certificate (Host Certificate) according to a predetermined program stored in advance in the memory card 200, and permitting an access only to an area to which an access is permitted.

5. Certificate Including Permission Information of Access to Protected Area

Next, a configuration example of a certificate which needs to be presented to the memory card when an access is made to the protected area (Protected Area) 210 of the above memory card 200 will be described with reference to FIG. 8.

As described above, the memory card 200 performs processing of authenticating an apparatus which writes or reads data in and from the memory card 200. At a stage of this authentication processing, an apparatus certificate (for example, a server certificate (Server Certificate)) such as a public key certificate is received from an apparatus of another party, that is, an access request apparatus, and whether or not to permit an access to each partitioned area of the protected area (Protected Area) 210 is determined using information described in this certificate.

An example of an apparatus certificate used for this authentication processing will be described with reference to FIG. 8.

Figure 8:
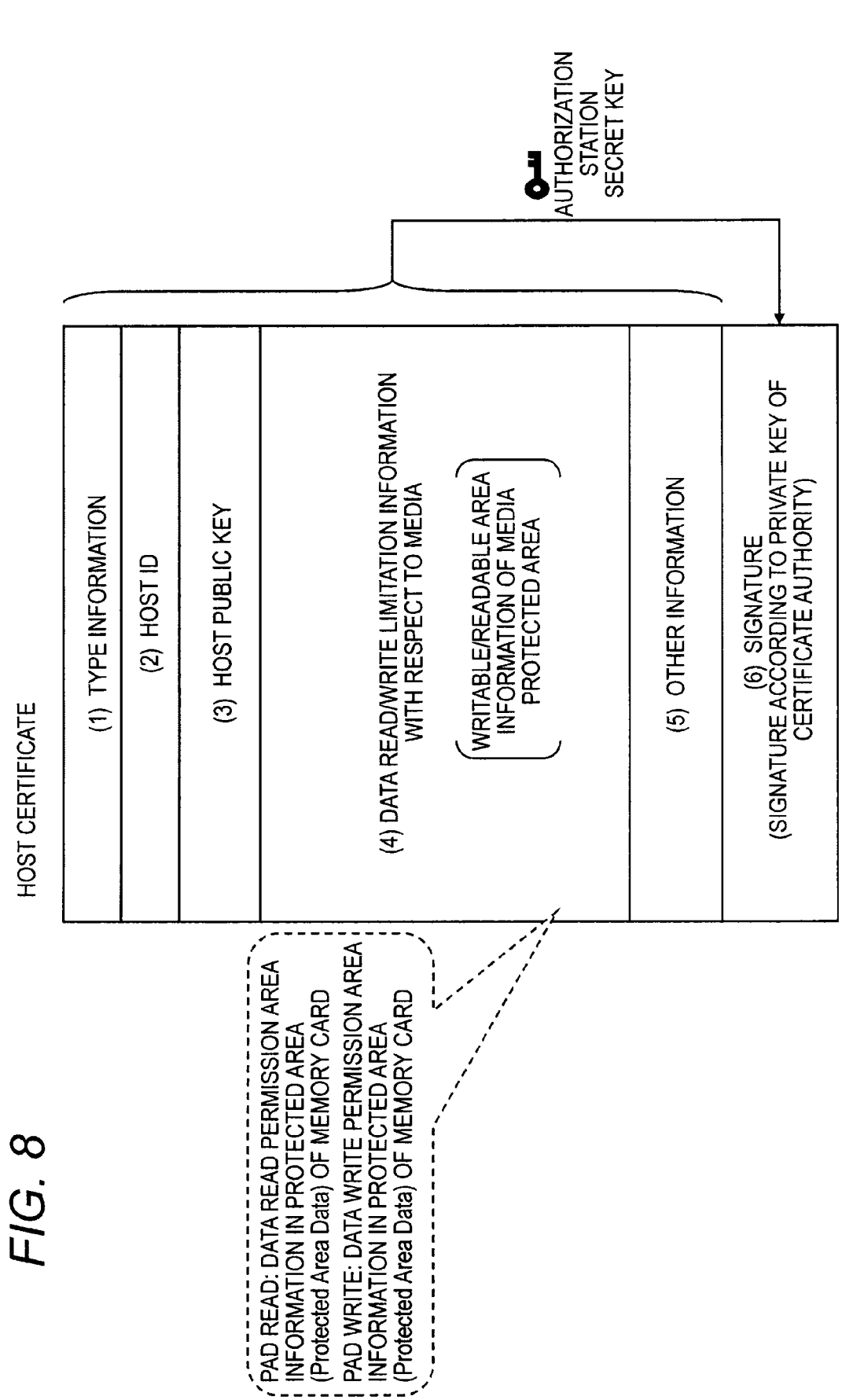
FIG. 8 is a view for explaining a host certificate (Host Certificate).

The certificate illustrated in FIG. 8 is a host certificate (Host Certificate). The host certificate is provided to a user device (host device) such as the PC 21, the playback apparatus 22, the television 23 or the playback apparatus 41 which executes content playback processing illustrated in FIG. 1, and stored in these devices.

The host certificate (Host Certificate) is provided to each user device (host device) by, for example, a certificate authority which is an agent which issues a public key certificate. For example, the host certificate (Host Certificate) is a certificate of a user device which is issued to a user device (host device) for which the certificate authority permits content usage processing, and is a certificate in which, for example, a public key is stored. The host certificate (Host Certificate) is set with a signature by a private key of the certificate authority, and is configured as data which is prevented from being falsified.

In addition, the server which accesses the protected area of the memory card 200 receives a supply of a server public key which employs the same configuration as that of the host certificate and a server certificate (Sever Certificate) in which access permission information of the memory card is recorded.

The configuration of the host certificate (Host Certificate) illustrated in FIG. 8 will be described.

Figure 6:
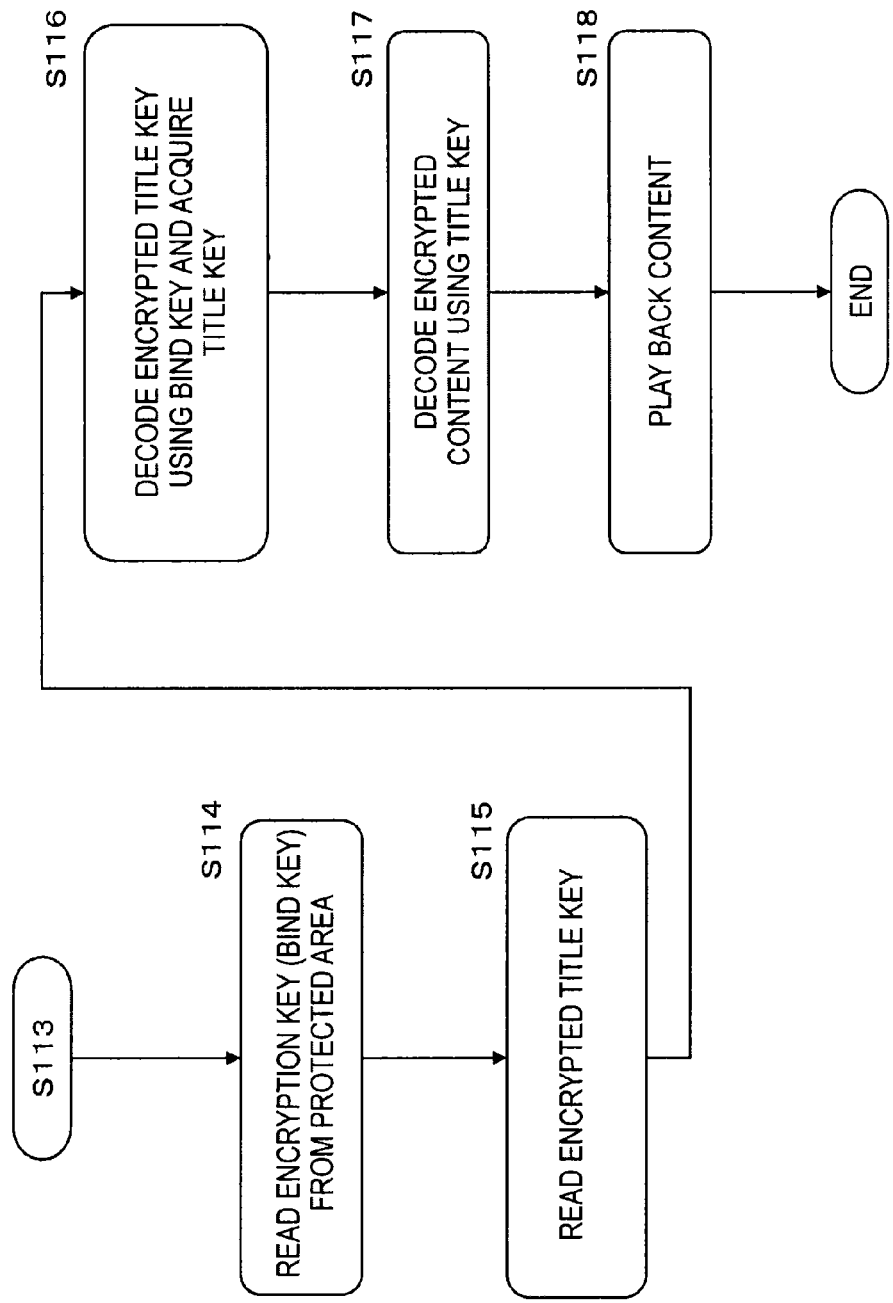
FIG. 6 is a view illustrating a flowchart for explaining a content playback processing sequence.

The host certificate (Host Certificate) includes the following data as illustrated in FIG. 6.

(1) Type Information (2) Host ID (User Device ID)

(3) Host Public Key (Host Public Key)

(4) Read/Write Limitation Information with respect to Medium (PAD Read/PAD Write)

(5) Other Information (6) Signature (Signature)

Each of the above data (1) to (6) will be described below.

(1) Type Information

Type information is information which indicates a type of a certificate or a type of a user device, and in which, for example, data indicating that this certificate is a host certificate, and information indicating a type of a device such as a PC or a type of a device such as a music player are recorded.

(2) Host ID

A host ID is an area in which a device ID as device identification information is recorded.

(3) Host Public Key (Host Public Key)

A host public key (Host Public Key) is a public key of a host device. The public key and a private key provided to a host device (user device) configure a key pair according to a public key encryption method.

(4) Read/Write Limitation Information with Respect to Medium (PAD Read/PAD Write)

In read/write limitation information (PAD Read/PAD Write) with respect to a medium, information as to a partitioned area in which data is permitted to be read (Read) or written (Write) in the protected area (PDA: Protected Area) 210 set in the storage area of a medium in which content is recorded such as the memory card 200 illustrated in, for example, FIG. 7 is recorded.

(5) Other Information, (6) Signature (Signature)

In the host certificate, above (1) to (4) and, in addition, various pieces of information are recorded, and signature data of the information (1) to (5) is recorded.

The signature is executed by the private key of the certificate authority. When information recorded in the host certificate such as a host public key is extracted and used, signature verification processing to which a public key of a certificate authority is applied is executed to check that the host certificate is not falsified, and, on a condition of this check, data in which the certificate such as the host public key is stored is used.

In addition, although FIG. 8 illustrates a host certificate in which access permission information of a user device (host device) with respect to a protected area of a memory card is recorded, a certificate (server certificate (server public key certificate)) in which access permission information with respect to a protected area of a memory card is recorded is provided to a server which needs to access the protected area such as a content providing server which provides content to the memory card similar to the host certificate illustrated in FIG. 8.

6. Example of Processing of Accessing Memory Card to which Certificate of Each Apparatus is Applied As described above with reference to FIG. 8, when an access is made to the protected area (Protected Area) 210 of the memory card 200, it is necessary to present the certificate illustrated in FIG. 8 to a memory card.

The memory card checks, for example, the certificate illustrated in FIG. 8, and determines whether or not an access can be made to the protected area (Protected Area) 210 of the memory card 200 illustrated in FIG. 7.

The host device holds, for example, the host certificate (Host Certificate) described with reference to FIG. 8, and the server which provides content holds a certificate (Server Certificate) associated with the server.

When each of these devices accesses the protected area (Protected Area) of the memory card, it is necessary to provide the certificate held by each device to the memory card and wait for the memory card to determine whether or not an access can be made based on verification on the memory card side.

A setting example of access limitation in case that an access request apparatus which requests an access to a memory card is a host device such as a recording/playback apparatus will be described with reference to FIG. 9.

Figure 9:
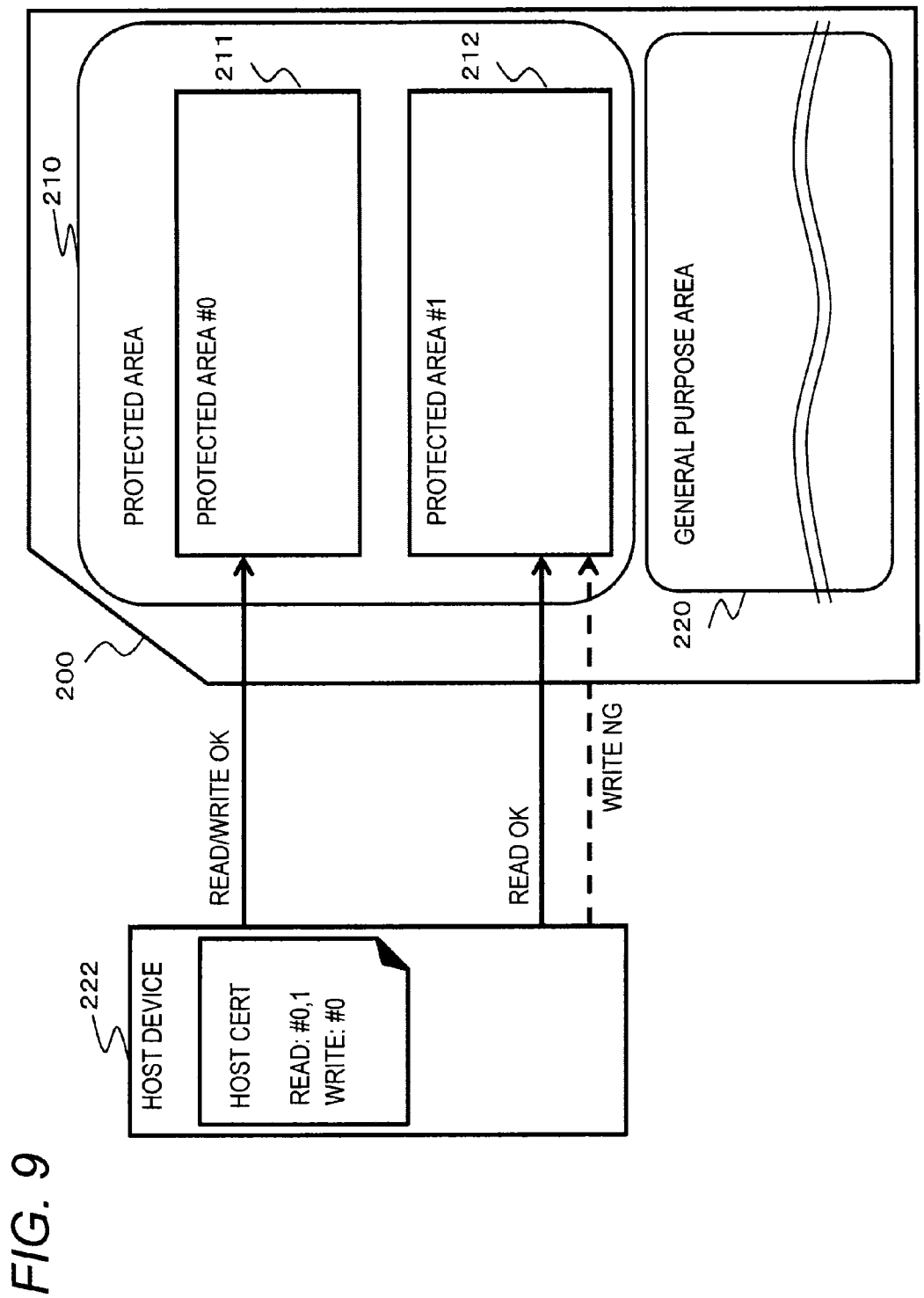
FIG. 9 is a view for explaining a specific configuration example of a storage area of a memory card and an example of access control processing.

FIG. 9 illustrates a host device 222 which is an access request apparatus which requests an access to the memory card and a memory card 200 from the left.

The host device 222 is, for example, the user device illustrated in FIG. 1 and is a user device (host device) such as the PC 21, the playback apparatus 22, the television 23 and the playback apparatus 41 which execute content playback processing, and is an apparatus which executes processing of outputting content to the memory card 200 and plays back content recorded in the memory card 200.

When outputting encrypted content stored in the memory unit of each user device to the memory card 200, these user devices (host devices) execute processing of writing an encryption key (for example, a bind key) stored in the user device, in the protected area (Protected Area) 210 of the memory card 200.

Further, when encrypted content recorded in the memory card 210 is used and played back, processing of acquiring an encryption key (for example, a bind key) written in the protected area (Protected Area) 210 of the memory card 200 is executed.

Upon this processing, an access to the protected area (Protected Area) 210 of the memory card 200 is required.

The memory card 200 has the protected area (Protected Area) 210 and the general purpose area (General Purpose Area) 220, and, for example, encrypted content is recorded in the general purpose area (General Purpose Area) 220.

A bind key which is a key required upon playback of content is recorded in the protected area (Protected Area) 210.

As described above with reference to FIG. 7, the protected area (Protected Area) 210 is partitioned into a plurality of areas.

FIG. 9 illustrates an example of two partitioned areas of a partitioned area #0 (Protected Area #0) 211 and a partitioned area #1 (Protected Area #1) 212.

A setting mode of these partitioned areas enables various settings.

In the example illustrated in FIG. 9, the host certificate (Host Certificate) held by the host device 222 is set to permit processing of both recording (Write) and reading (Read) data in and from a partitioned area #0 (Protected Area #0) and permit only processing of reading (Read) data from a partitioned area #1 (Protected Area #1).

The host certificate (Host Certificate) illustrated in FIG. 9 is not set to permit processing of writing (Write) data in the partitioned area #1 (Protected Area #1).

For example, the certificate in which this access permission information is recorded is provided to the user device.

A device which accesses the protected area (Protected Area) 210 of the memory card 200 outputs the certificate in which this access permission information is recorded to the memory card, whether or not an access can be made is determined based on certificate verification processing in the data processing unit in the memory card, and the device accesses the protected area (Protected Area) 210 of the memory card 200 according to determination information.

Thus, to the protected area (Protected Area) of the memory card, access control information as to whether to permit or not to permit to write (Write) and read (Read) data in access request apparatus units and partitioned area (#0, #1, #2 and . . . ) units.

This access control information is recorded in a certificate (a server certificate or a host certificate) of each access request apparatus, and the memory card verifies a signature of a certificate received from the access request apparatus, checks validity and reads access control information described in the certificate, that is, the following information.

Based on read permission area information (PAD Read) and write permission area information (PAD Write), only processing which the access request apparatus is authorized to perform is permitted and executed.

In addition, a host device includes various types of devices such as a CE device such as a recorder or a player or a PC.

A device certificate is a certificate individually held by each device, and is set a different setting according to the type of the device.

Further, the data processing unit of the memory card may determine access permission in partitioned area units of a protected area based on not only the following information recorded in a device certificate, that is, read permission area information (PAD Read)

and write permission area information (PAD Write)

but also, for example, type information (Type) included in the certificate described with reference to FIG. 8.

7. Example of Content Recording Processing Supported by Data Recording Configuration According to First Embodiment Next, a sequence of executing processing of recording data employing a data recording configuration described with reference to FIG. 2 will be described with reference to FIG. 10.

Hereinafter, a sequence in case that the PC 21 as the user device 20 illustrated in FIG. 1 records, for example, content recorded in a medium (for example, a hard disk) of the PC, in a detachable medium such as the memory card 30 will be described as an example of data recording processing.

Figure 10:
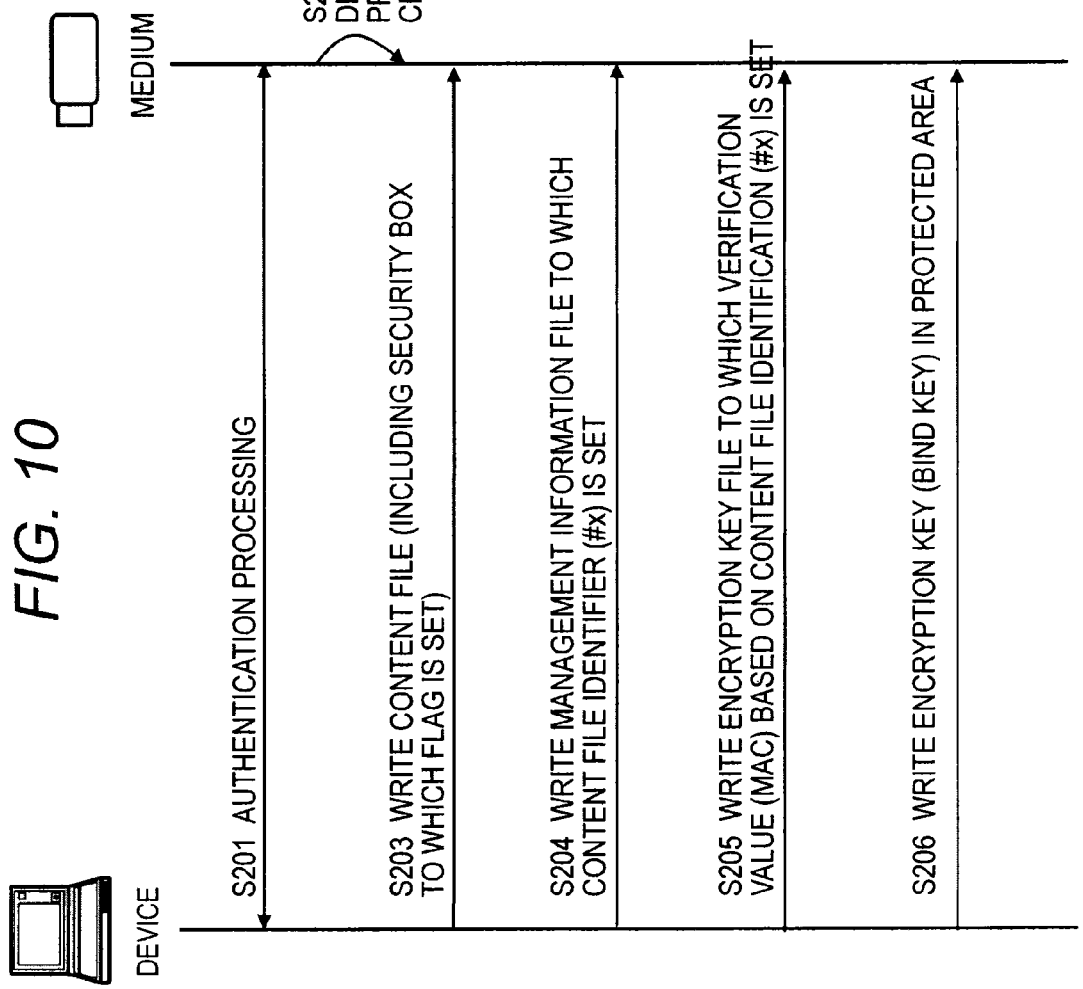
FIG. 10 is a view illustrating a sequence diagram for explaining a data recording sequence.

FIG. 10 illustrates a device (for example, the PC 21 illustrated in FIG. 1) which holds and outputs content and a medium (for example, the memory card 30 illustrated in FIG. 1) which is a content recording target from the left.

In addition, although FIG. 10 illustrates an example of processing between a device and a medium as an example of content recording processing, the content recording processing can be executed not only between the device and the medium but also between a PC and a playback apparatus as inter-device processing, and can be further executed between a server and a device and between a server and a medium.

A device (PC) which executes content recording illustrated in FIG. 10 is a device which holds, for example, encrypted content, management information of the encrypted content and an encryption key from the content providing server 12 illustrated in FIG. 1.

The management information includes the following information described above with reference to FIG. 2.

The management information includes (a) a token (Token) and (b) usage control information (Usage File).

Each processing will be described according to the sequence diagram in FIG. 10.

First, a device is attached a medium (for example, a memory card), and executes mutual authentication processing between the device and the medium in step S201. According to, for example, a public key encryption method, mutual authentication processing including processing of exchanging mutual public key certificates of the device and the medium is performed.

Both of the device and medium (memory card) hold certificates (Certificate) which store public keys issued by a certificate authority, and private keys. The certificate (Certificate) held by the device is the host certificate (Host Certificate) described above with reference to FIG. 8, and access right information related to a protected area of a memory card is recorded therein in addition to a public key.

In addition, the medium (memory card) stores programs which perform mutual authentication processing and determine whether or not an access can be made to the protected area (Protected Area), and has a data processing unit which executes these programs.

When mutual authentication between the device and the medium (memory card) succeeds, validity of both is checked, and processing subsequent to step S202 is executed.

When mutual authentication does not succeed, processing subsequent to step S202 is not executed.

When mutual authentication between the device and the medium succeeds and validity of both is checked, the data processing unit of the medium refers to the public key certificate (host certificate (Host Certificate) illustrated in FIG. 8) provided to the medium by the device upon authentication processing in step S202, and checks an access right to the protected area (Protected Area) of the medium.

In addition, upon processing of recording content in the medium, it is necessary to write an encryption key (bind key) in the protected area (Protected Area) of the medium. Hence, the data processing unit of the medium checks whether or not write (Write) permission information with respect to one or more partitioned areas of the protected area (Protected Area) is recorded in the certificate (host certificate (Host Certificate) illustrated in FIG. 8) received from the device.

When there is no write (Write) permission information with respect to a partitioned area, this device is not permitted to write an encryption key in the protected area (Protected Area) of the medium (memory card). In this case, processing subsequent to step S203, that is, processing of providing content to a medium is stopped.

When write (Write) permission information with respect to one or more partitioned areas of the protected area (Protected Area) of a medium is recorded in the certificate (host certificate (Host Certificate) illustrated in FIG. 8) provided from the device to the medium, an encryption key provided by the device can be recorded in the protected area (Protected Area) and, only in this case, processing subsequent to step S203 is executed.

In steps S203 to S206, the device transmits the following data to the medium, and performs writing processing.

(a) Content File (b) Management Information and First Key Data (c) Encryption Key (Bind Key)

These pieces of information correspond to data (a) to (c) described with reference to FIG. 2.

In step S203, a content file is written.

A security box including a flag described above with reference to FIG. 2 is set to a content file to provide to a medium.

That is, the security box is a security box which has a flag to which information indicating whether or not it is necessary to perform processing of referring to a management information file upon playback of content is set.

In step S204, management information files in (b) the management information and the first key data are written.

The management information files are, for example, a token file and a usage control information file included in (b) the management information and the first key data described with reference to FIG. 2. File names of these management information files are recorded as file names including a content file identifier (#x). Alternatively, these management information files are recorded in a directory including the content file identifier (#x) in a directory name.

In addition, these file names may be set or the directory name may be set by the data processing unit of the medium not by processing on the medium side.

In step S205, first key data in (b) the management information and the first key data is written.

The first key data included in (b) the management information and the first key data is the key information file 123 illustrated in FIG. 2. The key information file includes an encrypted title key encrypted by a bind key and, in addition, an ID verification value (#x).

As described above with reference to FIG. 2, the ID verification value (#x) is a verification value (MAC) generated based on an ID (medium ID/device ID) of a medium or a device which records a content file and the content file identifier (#x).

A device which executes content recording processing acquires a medium ID of a medium which is a content recording destination such as the memory card in this example, generates the verification value (MAC) based on this medium ID and the content file identifier, stores the verification value in the key information file 123, and provides the verification value to the medium (memory card) to record.

In addition, the medium ID is recorded in the public key certificate provided from the medium to the device upon authentication processing in step S201.

In step S206, the encryption key (bind key) is written.

The encryption key (bind key) is recorded in the protected area (Protected Area) of the medium as illustrated in FIG. 2. In addition, writing processing with respect to this protected area is executed with respect to an area for which an access right is authorized as a result of access right determination based on the certificate of the device performed by the medium in step S202.

Upon processing of recording a content file, a flag indicating whether or not it is necessary to refer to management information is set to a content file.

A content file identifier is included in a file name of a management information file or a set directory.

A verification value (MAC) based on an ID of a content recording device (a device or a medium) is recorded in the encryption key file.

The bind key is recorded in the protected area.

These processing is executed.

Upon content playback processing, processing is executed based on these items of recorded data according to the flows described above with reference to FIGS. 4 to 7.

Upon playback processing, for example, the following processing can be executed.

It is possible to determine whether or not it is necessary to refer to management information based on a flag value of the security box of the content file.

It is possible to reliably select a management information file associated with content based on an identifier of a content file of a file name of a management information file or a set directory.

It is possible to verify whether or not content is recorded in a medium or a device according to a valid recording sequence, based on a verification value (MAC) based on the ID of the content recording device (a device or a medium) set to the encryption key file.

By acquiring a bind key from the accessible protected area based on the certificate, only the device which has the access right to the protected area can play back content.

According to this processing, it is possible to realize valid content usage processing.

8. Recording Configuration Example 2 of Content and Management Information

Second Embodiment

Next, a recording configuration example 2 of content and management information according to the present disclosure (second embodiment) will be described with reference to FIG. 11.

Figure 11:
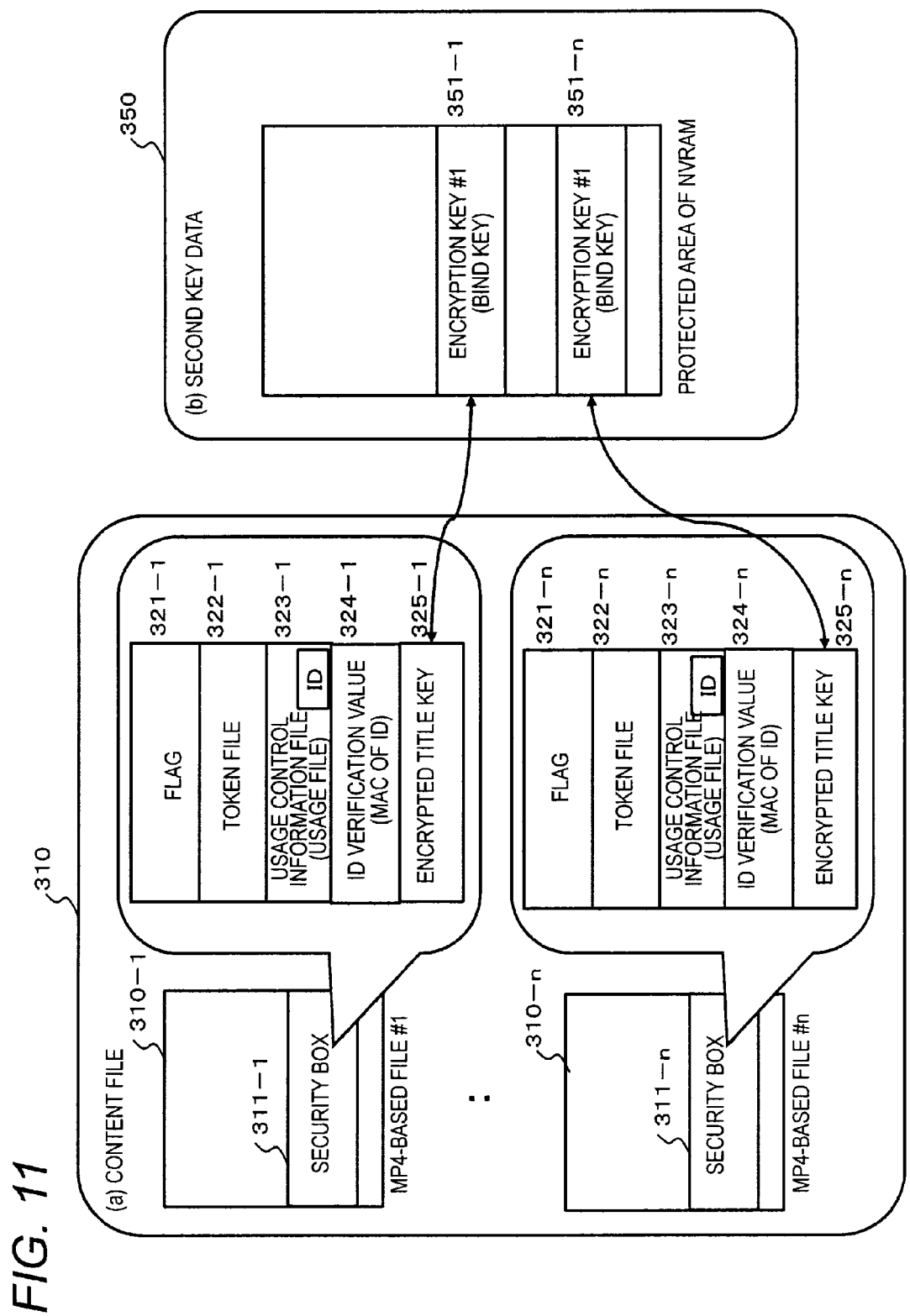
FIG. 11 is a view illustrating an example of a configuration of recording data in a medium.

FIG. 11 is a view illustrating a data recording configuration of a medium (recording medium) similar to FIG. 2 described above and, more specifically, a recording configuration example of each data such as a content file, a management information file and key information used upon content playback processing.

The medium (recording medium) is, for example, the memory card 30 illustrated in FIG. 1 or recording media provided in the PC 21, the playback apparatus 22, the television 23 and the playback apparatus 41.

The recording configuration of the medium illustrated in FIG. 11 is realized upon, for example, the following recording processing.

(1) The PC 21, the playback apparatus 22, the television 23 and the playback apparatus 41 as the user devices 20 record data acquired from the content providing servers 12a and 12b, in the memory card 30 according to the data recording configuration illustrated in FIG. 11.

Alternatively, (2) The PC 21, the playback apparatus 22, the television 23 and the playback apparatus 41 as the user devices 20 record data acquired from the content providing servers 12a and 12b, in the recording medium such as the hard disk of the user device according to the data recording configuration illustrated in FIG. 11.

The data recording configuration illustrated in FIG. 11 is, for example, a recording configuration set upon the above recording processing (1) and (2).

An example of executing the above processing (1), that is, a processing example of performing recording according to the data recording configuration illustrated in FIG. 11 when the PC 21, the playback apparatus 22, the television 23 and the playback apparatus 41 as the user devices 20 record data acquired from the content providing servers 12a and 12b, in the memory card 30 will be described below.

A processing example in case that the memory card 30 is attached to the PC 21 of the user devices 20 illustrated in FIG. 1 to record data in the memory card 30 will be described as a specific example.

That is, a processing example will be described where the PC 21 records each data such as a content file, a management information file and key information acquired from the content providing server 12 and recorded in the hard disk of the PC 21, in the memory card 30.

As illustrated in FIG. 11, in the memory card 30, each data such as (a) a content file 310,
(b) second key data 350 is recorded.

FIG. 11 illustrates an example where n content file #1 310-1 to content file #n 310-n are recorded as (a) the content file 310.

These content files are, for example, encoded data files of an MP4 format, and are data files including encrypted content obtained by encrypting playback target data such as movie or music.

In each of the content file #1 310-1 to the content file #n 310-n, security boxes 311-1 to n in which, for example, management information is recorded are stored in addition to encrypted content.

The following information is recorded in the security box 311.

The security box 311 including data of a flag (flag) 321 which indicates an attribute of content included in a content file, a token file 322 as a management information file, a usage control information file 323 as a management information file, a verification value (MAC) 324 based on an ID of an apparatus such as a device or a medium which records a content file and an encrypted title key 325 is set in each content file.

A flag is the same flag as the flag described above with reference to FIG. 2, and is a flag including information as to whether or not it is necessary to refer to a management information file upon use of content.

Further, for example, a flag which has information indicating a type of a content usage control system (DRM: Digital Rights Management) such as a DRM type such as Marlin may be set.

A setting of a flag includes, for example, flag value=0: it is not necessary to perform processing referring to a management information file, flag value=1: it is necessary to perform processing referring to a management information file, or flag value=00: it is not necessary to perform processing referring to a management information file, flag value=01: content usage control system (DRM)=marlin (Marlin) holds and it is necessary to perform processing referring to a management information file, and flag value=02: content usage control system (DRM)=xxxx holds and it is necessary to perform processing referring to a management information file.

When, for example, the content playback program (application) executed on the OS such as above Android reads the content file 110-x and plays back content, a security box included in the read content file 110-x is acquired and a flag value is referred to. The playback apparatus can determine based on the referred flag value whether or not it is necessary to read a management information file and process data based on the management information file.

In addition, to smoothly execute this processing, data in the security box or at least a flag is preferably unencrypted data.

Further, in the present embodiment, the following management information file is recorded in the security box 311 in the content file 310.

The management information file includes a token file (Token File) 322 which is a file in which data which is a content ID as a content identifier and is used to check and verify playback content is stored and a usage control information file (Usage File) 323 which defines a content usage condition such as copy/playback control information.

The token file 322 is a file which includes data described above with reference to FIG. 3.

In addition, in the usage control information file 323, an identifier (ID) of a bind key which is an encryption key of an encrypted title key is recorded.

The playback apparatus can select the bind key which is the encryption key of the encrypted title key of the content file based on the ID recorded in the usage control information file 323.

Further, in the security box 311 in the content file 310, a verification value (MAC) based on an identifier (medium ID) of a medium which is a recording apparatus of a content file and an identifier (device ID) of a device, that is, an ID verification value (MAC of ID) 324 is recorded.

Furthermore, in the security box 311 in the content file 310, the encrypted title key 325 encrypted by the bind key is recorded.

In the present embodiment, in the content file, a security box including a management information file and the encrypted title key is recorded in addition to playback target encrypted content. According to this file setting processing, the content playback execution program (application) executed in the playback apparatus which plays back content can immediately acquire, for example, management information associated with this content only by acquiring the playback scheduled content file (#x).

Further, the content playback execution program (application) which is executed by the playback apparatus which plays back content acquires a verification value (MAC of ID) included in the security box of the content file, and executes verification processing based on the acquired verification value.

More specifically, when, for example, the data illustrated in FIG. 11 is recorded in the memory card 30 illustrated in FIG. 1 and the playback apparatus 41 illustrated in FIG. 1 is attached the memory card 30 and plays back content included in the content file 310-x, the playback apparatus 41 acquires the identifier (medium ID) of the memory card 30 and calculates a MAC based on the acquired medium ID. Further, processing of matching the calculated MAC and the verification value (MAC of ID) 324 included in the security box of the content file is executed.

In this match processing, when a match is found (both of MACs match), it is determined that content is stored in a medium according to valid processing, and then the flow proceeds to playback of content.

Meanwhile, when a match is not found (both of MACs do not match), it is determined that content is not stored in a medium according to valid processing and, for example, there is a probability that copy is invalidly performed between media, and then content is not played back.

As illustrated in FIG. 11, (b) second key data 350 is further recorded in the memory card.

This is the same bind key 351 as that described above with reference to FIG. 2. The bind key 351 is an encryption key of the encrypted title key 325.

The bind key 351 is recorded in a protected area (Protected Area) of the memory card. In addition, the protected area (Protected Area) is an access limited area as described above, and is an area which the access request apparatus is permitted to access according to access permission information described in a certificate by verifying the certificate presented to the memory card.

When, for example, the playback apparatus 41 illustrated in FIG. 1 is attached the memory card 30 and plays back content recorded in the content file 310-x stored in the memory card 30, the playback apparatus 41 outputs the certificate (for example, a public key certificate) of the playback apparatus to the memory card 30.

The memory card 30 verifies the certificate of the playback apparatus 41, and determines whether or not to permit an access to the protected area (Protected Area) according to the access permission information described in the certificate.

Only when it is determined that the access is permitted, the playback apparatus 41 can read the bind key 351 from the protected area (Protected Area) of the memory card 30.

An encrypted title key is decoded by using the read bind key 351 to acquire a title key, and encrypted content included in the content file 310-x is decoded using the acquired title key to perform playback.

9. Example of Content Playback Processing Supported by Data Recording Configuration According to Second Embodiment Next, a playback sequence in case of executing processing of reading and playing back content recorded in a medium employing a data recording configuration described with reference to FIG. 11 will be described with reference to the flowcharts illustrated in FIG. 12 and subsequent drawings.

Figure 12:
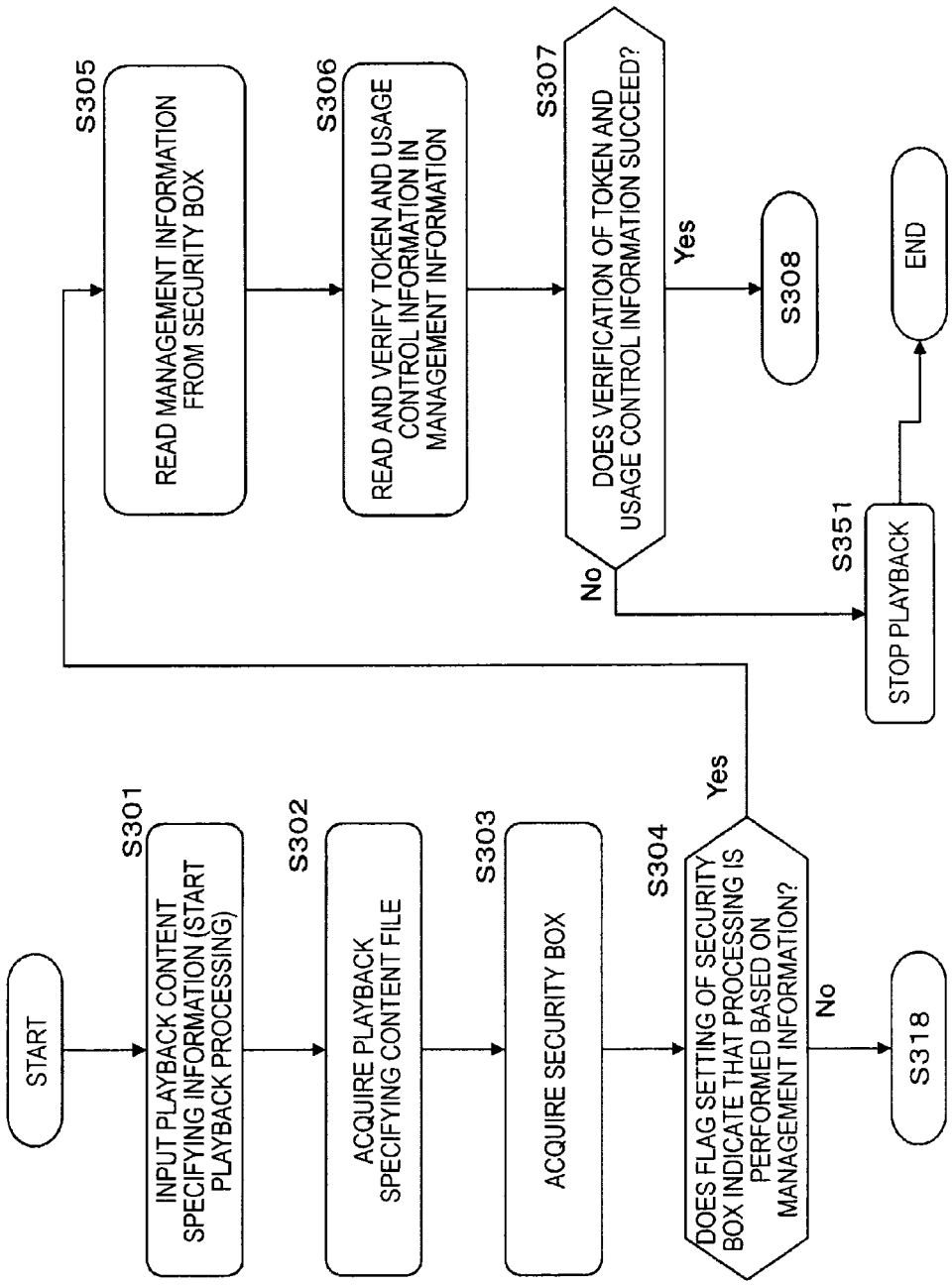
FIG. 12 is a view illustrating a flowchart for explaining a content playback processing sequence.

The content playback processing according to the flowcharts in FIG. 12 and subsequent drawings is executed by the apparatus which executes processing of reading a content file from a medium which stores data illustrated in FIG. 11 and playing back the content file.

The content playback processing is, for example, processing executed when the playback apparatus 41 illustrated in FIG. 1 is attached the memory card 30 which stores data illustrated in FIG. 11 and reads and plays back a content file stored in the memory card 30.

In addition, content playback processing in the playback apparatus 41 is performed when a data processing unit of the playback apparatus 41 executes a playback program (application) stored in the memory of the playback apparatus 41 in advance, and processing in each step illustrated in the flowcharts in FIG. 12 and subsequent drawings is executed by the data processing unit of the playback apparatus 41.

Processing in each step indicated in the flows in FIG. 12 and the subsequent drawings will be described.

First, in step S301, a playback sequence is started by inputting playback content specifying information.

Processing in step S301 is more specifically performed as processing of detecting an input of content specifying information from the user with respect to, for example, content information which is displayed on a display of the playback apparatus 41 and can be played back.

Next, in step S302, a playback specified content file is acquired. For example, a content file recorded in the memory card 30 attached to the playback apparatus 41 is acquired.

More specifically, for example, the data processing unit of the playback apparatus 41 performs processing of reading the content file #1 310-1 illustrated in FIG. 11 from the memory card 30.

Next, in step S303, a security box is acquired from the read content file.

As described above with reference to FIG. 11, in the security box 311 included in the content file, the following information is recorded.

Each data of the flag (flag) 321 which indicates an attribute of content included in a content file, the token file 322 as a management information file, the usage control information file 323 as a management information file, the verification value (MAC) 324 based on an ID of an apparatus such as a device or a medium which records a content file and the encrypted title key 325 is recorded.

The flag has, for example, information as to whether or not it is necessary to refer to a management information file upon use of content.

For example, a setting includes flag value=0: it is not necessary to perform processing referring to a management information file and flag value=1: it is necessary to perform processing referring to a management information file.

In step S304, the playback apparatus determines whether or not the flag value of the security box indicates that it is necessary to perform processing referring to a management information file.

When the flag value indicates that it is necessary to perform processing of referring to the management information file, the flow proceeds to step S305.

When the flag value indicates that it is not necessary to perform processing of referring to the management information file, the flow proceeds to step S318 and proceeds to playback of content. This is processing performed with respect to content for which use control is unnecessary such as service content, and is processing in case that content is content which is not encrypted and which can be freely used. In this case, processing in steps S305 to S317 is skipped and the flow proceeds to playback of content included in a content file.

Meanwhile, when the flag value indicates that it is necessary to perform processing of referring to a management information file, the flow proceeds to step S305 to read a management information file.

In the present embodiment, the management information file is recorded in the security box in the content file. Consequently, it is possible to correctly select the management information file associated with the playback scheduled content.

Next, in step S306, the playback apparatus reads a token and usage control information which are management information files associated with playback scheduled content file, and verifies a signature for verifying falsification set to these items of data.

When it is determined in step S307 that verification succeeds, the flow proceeds to step S308 and, when verification does not succeed, the flow proceeds to step S351 and playback processing is stopped.

When it is determined in step S307 that verification succeeds and validity of the token and usage control information is checked, the flow proceeds to step S308 and content based on constituent data of the token and the usage control information is verified or permission processing is checked.

Next, in step S309, the playback apparatus reads a medium ID which is an identifier of the memory card which stores a content file.

Next, in step S310, the playback apparatus calculates a verification value (for example, MAC) based on the read medium ID. In addition, this calculating algorithm is an algorithm determined in advance, and the same algorithm as an algorithm of calculating the ID verification value 324 recorded in the security box 311 described above with reference to FIG. 11 is applied.

Next, in step S311, the playback apparatus acquires the ID verification value 324 recorded in the security box 311 described with reference to FIG. 11, and, in step S312, the playback apparatus executes processing (MAC verification) of matching the calculated MAC value and the ID verification value 324.

In step S313, when it is determined that the calculated MAC and the read MAC match, it is determined that a medium is subjected to valid content writing processing and processing in steps subsequent to step S314 is executed.

In step S313, when it is determined that the calculated MAC and the read MAC do not match, it is determined that there is a probability that a medium is not subjected to valid content writing processing and the flow proceeds to step S351 to stop processing without executing processing in steps subsequent to step S314.

When the calculated MAC and the read MAC match in step S313 and the flow proceeds to step S314, the playback apparatus reads an encryption key (bind key) recorded in a protected area of the memory card.

In addition, as a precondition of an access to this protected area, the playback apparatus presents a certificate (for example, a public key certificate) of the playback apparatus to the memory card. Only when the memory card determines whether or not there is an access right to the protected area based on the certificate received from the playback apparatus, and authorizes the access right, processing of reading a bind key from the protected area in step S314 is executed.

When the access right is not authorized, the processing in step S314 is not executed and playback of content is not permitted.

When the access right to the protected area of the memory card of the playback apparatus is checked and processing of reading the bind key from the protected area in step S314 is executed, in step S315, the playback apparatus then reads an encrypted title key associated with playback scheduled content from the security box 311 illustrated in FIG. 11.

Next, in step S316, the playback apparatus executes processing of decoding the encrypted title key using the bind key and acquires a title key.

Further, in step S317, processing of decoding encrypted content in a playback scheduled content file by using the acquired title key is executed, and, in step S318, the decoded content is played back.

10. Example of Content Recording Processing Supported by Data Recording Configuration According to Second Embodiment Next, a sequence of executing processing of recording data employing a data recording configuration described with reference to FIG. 11 will be described with reference to FIG. 15.

Hereinafter, a sequence in case that the PC 21 as the user device 20 illustrated in FIG. 1 records, for example, content recorded in a medium (for example, a hard disk) of the PC, in a detachable medium such as the memory card 30 will be described as an example of data recording processing.

Figure 15:
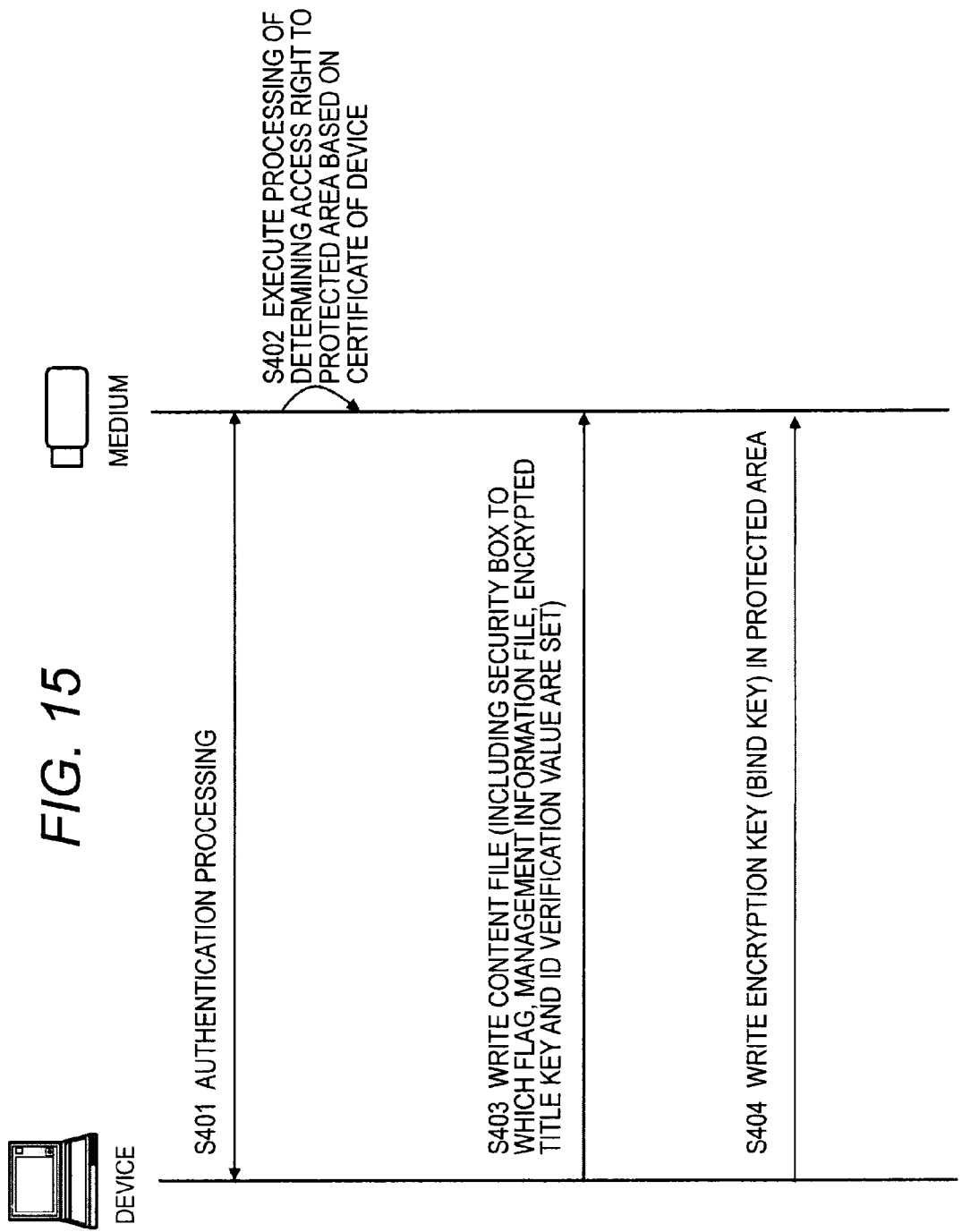
FIG. 15 is a view illustrating a sequence diagram for explaining a data recording sequence.

FIG. 15 illustrates
a device (for example, the PC 21 illustrated in FIG. 1) which holds and outputs content and
a medium (for example, the memory card 30 illustrated in FIG. 1) which is a content recording target
from the left.

In addition, although FIG. 15 illustrates processing between a device and a medium as an example of content recording processing, the content recording processing can be executed not only between the device and the medium but also between a PC and a playback apparatus as inter-device processing, and can be further executed between a server and a device and between a server and a medium.

A device which executes content recording illustrated in FIG. 15 is a device which holds, for example, encrypted content, management information of the encrypted content and an encryption key from the content providing server 12 illustrated in FIG. 1.

The management information includes the following information described above with reference to FIG. 11.

The management information includes (a) a token (Token) and
(b) usage control information (Usage File).

Each processing will be described according to the sequence diagram in FIG. 15.

First, a device is attached a medium (for example, a memory card), and executes mutual authentication processing between the device and the medium in step S401. According to, for example, a public key encryption method, mutual authentication processing including processing of exchanging mutual public key certificates of the device and the medium is performed.

Both of the device and medium (memory card) hold certificates (Certificate) which store public keys issued by a certificate authority, and private keys. The certificate (Certificate) held by the device is the host certificate (Host Certificate) described above with reference to FIG. 8, and access right information related to a protected area of a memory card is recorded therein in addition to a public key.

In addition, the medium (memory card) stores programs which perform mutual authentication processing and determine whether or not an access can be made to the protected area (Protected Area), and has a data processing unit which executes these programs.

When mutual authentication between the device and the medium (memory card) succeeds, validity of both is checked, and processing subsequent to step S402 is executed.

When mutual authentication does not succeed, processing subsequent to step S402 is not executed.

When mutual authentication between the device and the medium succeeds and validity of both is checked, the data processing unit of the medium refers to the public key certificate (host certificate (Host Certificate) illustrated in FIG. 8) provided to the medium by the device upon authentication processing in step S402, and checks an access right to the protected area (Protected Area) of the medium.

In addition, upon processing of recording content in the medium, it is necessary to write an encryption key (bind key) in the protected area (Protected Area) of the medium. Hence, the data processing unit of the medium checks whether or not write (Write) permission information with respect to one or more partitioned areas of the protected area (Protected Area) is recorded in the certificate (host certificate (Host Certificate) illustrated in FIG. 8) received from the device.

When there is no write (Write) permission information with respect to a partitioned area, this device is not permitted to write an encryption key in the protected area (Protected Area) of the medium (memory card). In this case, processing subsequent to step S403, that is, processing of providing content to a medium is stopped.

When write (Write) permission information with respect to one or more partitioned areas of the protected area (Protected Area) of a medium is recorded in the certificate (host certificate (Host Certificate) illustrated in FIG. 8) provided from the device to the medium, an encryption key provided by the device can be recorded in the protected area (Protected Area) and, only in this case, processing subsequent to step S403 is executed.

In steps S403 and S404, the device transmits the following data to the medium, and performs writing processing.
(a) Content File
(b) Encryption Key (Bind Key)
These pieces of information correspond to data (a) and (b) described with reference to FIG. 11.

In step S403, a content file is written.

A security box described above with reference to FIG. 11 is set to a content file to provide to a medium.

As described above with reference to FIG. 11, in the security box included in the content file, the following information is recorded.

Each data of the flag (flag) which indicates an attribute of content included in a content file,
the token file as a management information file,
the usage control information file as a management information file,
the verification value (MAC of ID) based on an ID of an apparatus such as a device or a medium which records a content file and
the encrypted title key
is recorded.

The flag has, for example, information as to whether or not it is necessary to refer to a management information file upon use of content.

For example, a setting includes
flag value=0: it is not necessary to perform processing referring to a management information file and
flag value=1: it is necessary to perform processing referring to a management information file.

The ID verification value (MAC of ID) is a verification value based on an ID of an apparatus such as a device or a medium which records a content file.

A device which executes content recording processing acquires a medium ID of a medium which is a content recording destination such as the memory card in this example, generates the verification value (MAC) based on this medium ID, stores the verification value in the security box, and provides the verification value to the medium (memory card) to record.

In addition, the medium ID is recorded in the public key certificate provided from the medium to the device upon authentication processing in step S401.

In step S404, the encryption key (bind key) is written.

The encryption key (bind key) is recorded in the protected area (Protected Area) of the medium as illustrated in FIG. 11. In addition, writing processing with respect to this protected area is executed with respect to an area for which an access right is authorized as a result of access right determination based on the certificate of the device performed by the medium in step S402.

Thus, in the present embodiment, upon processing of recording a content file, a content file including a security box having the following data is set and recorded.

A flag (flag) which indicates an attribute of content included in a content file,
a token file as a management information file,
a usage control information file as a management information file,
a verification value (MAC of ID) based on an ID of an apparatus such as a device or a medium which records a content file and
an encrypted title key
are recorded.
Further,
the bind key is recorded in the protected area.
These processing is executed.

Figure 13:
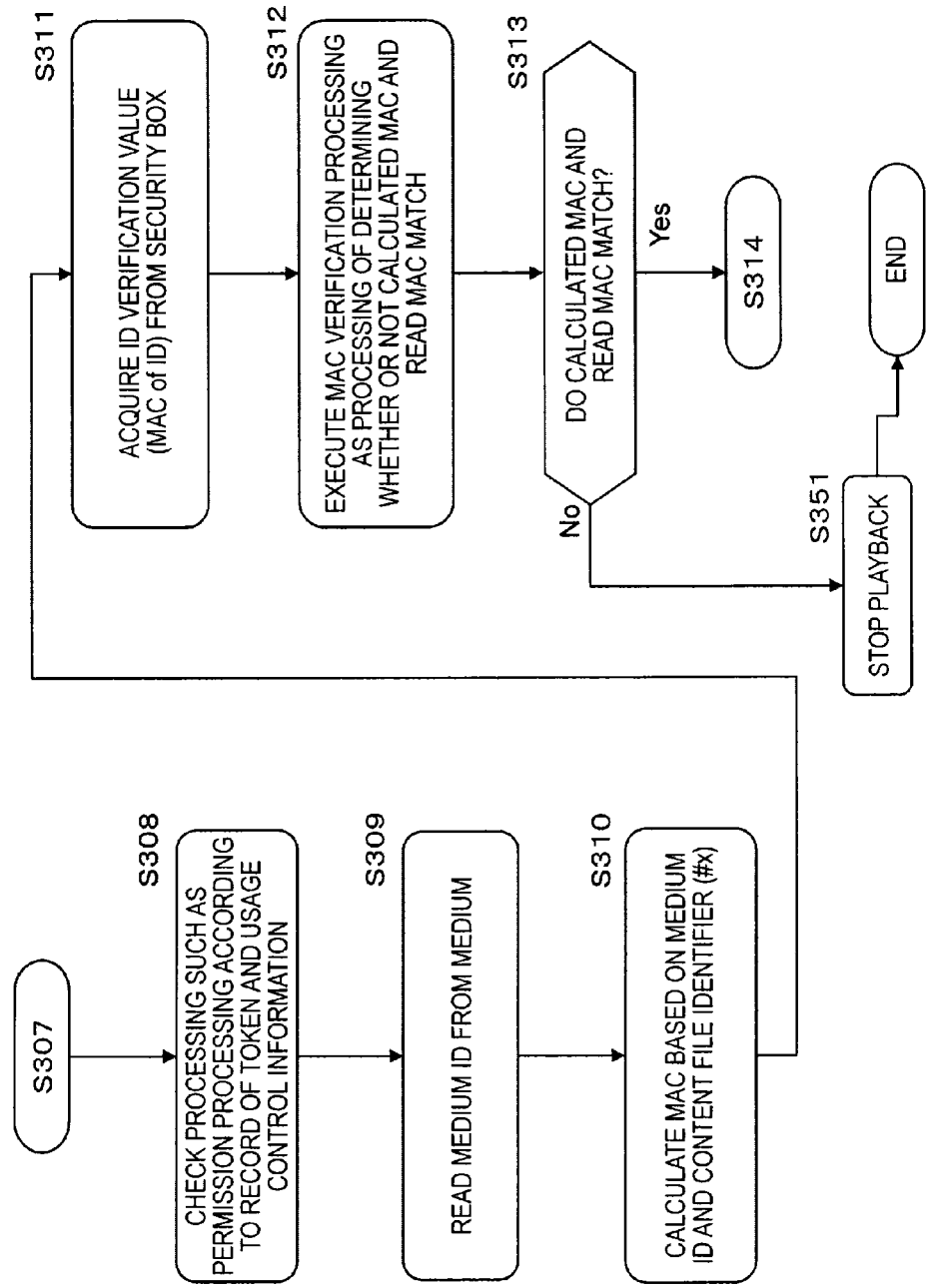
FIG. 13 is a view illustrating a flowchart for explaining a content playback processing sequence.
Figure 14:
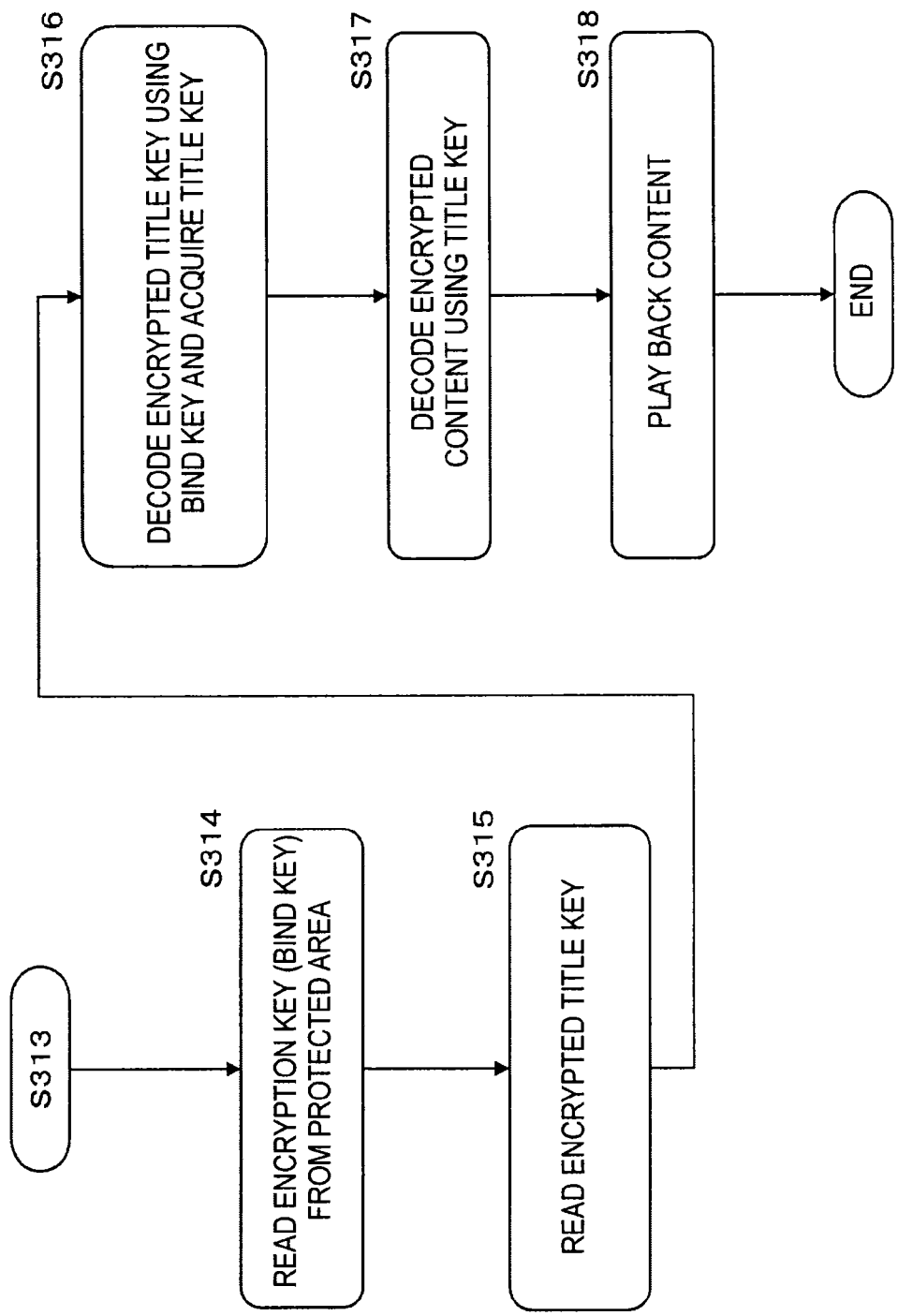
FIG. 14 is a view illustrating a flowchart for explaining a content playback processing sequence.

Upon content playback processing, processing is executed based on these items of recorded data according to the flows described above with reference to FIGS. 12 to 14.

Upon playback processing,
it is possible to determine whether or not it is necessary to refer to management information based on a flag value of the security box of the content file.

The management information file can be directly acquired from the security box in the content file.

It is possible to verify whether or not content is recorded in a medium or a device according to a valid recording sequence, based on a verification value (MAC) based on the ID of the content recording device (a device or a medium) set to the encryption key file.

By acquiring a bind key from the accessible protected area based on the certificate, only the device which has the access right to the protected area can play back content.

According to this processing, it is possible to realize valid content usage processing.

11. Recording Configuration Example 3 of Content and Management Information

Third Embodiment

Next, a recording configuration example 3 of content and management information according to the present disclosure (third embodiment) will be described with reference to FIG. 16.

Figure 16:
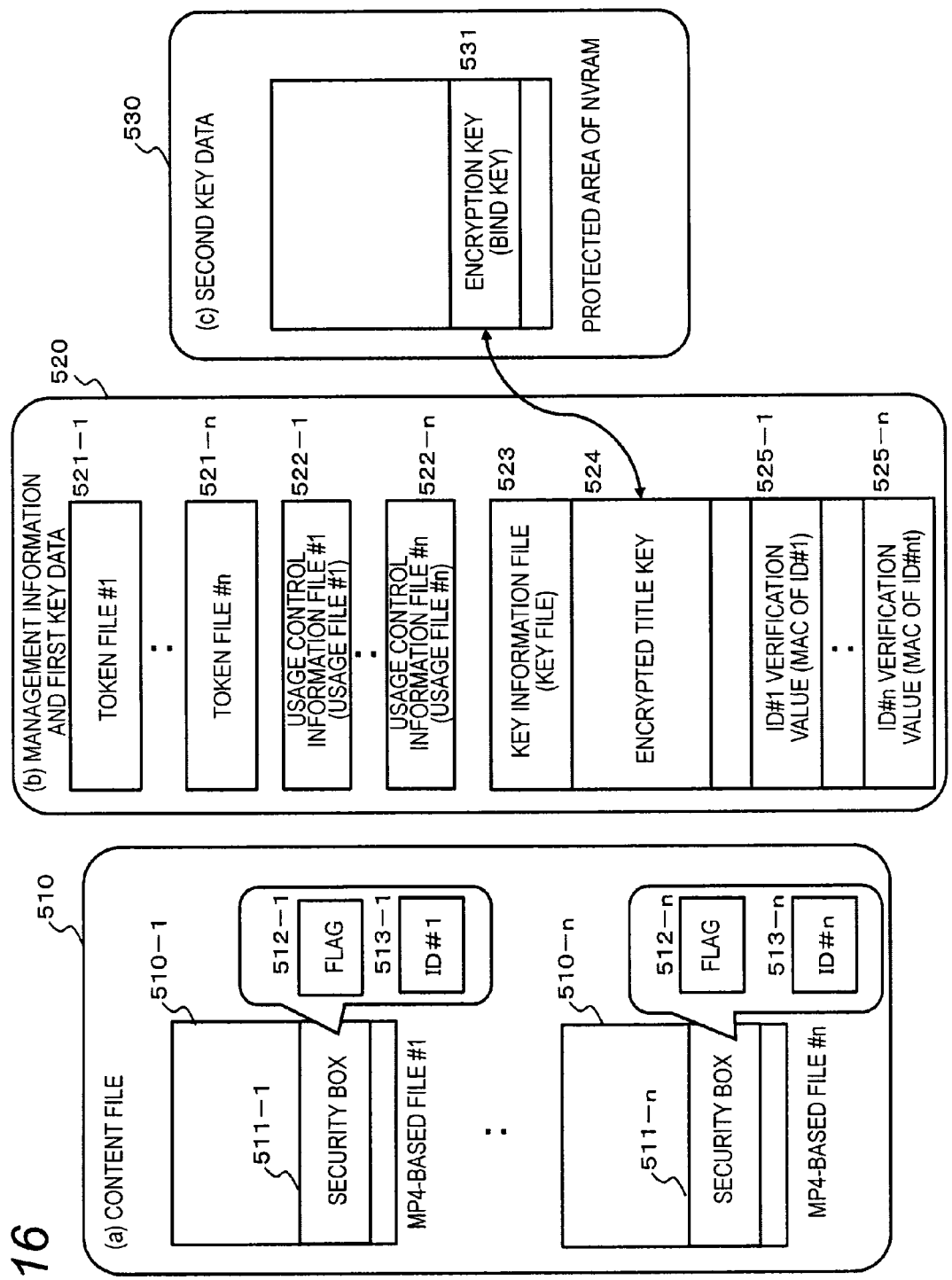
FIG. 16 is a view illustrating an example of a configuration of recording data in a medium.

FIG. 16 is a view illustrating a data recording configuration of a medium (recording medium) similar to FIG. 2 described above and, more specifically, a recording configuration example of each data such as a content file, a management information file and key information used upon content playback processing.

The medium (recording medium) is, for example, the memory card 30 illustrated in FIG. 1 or recording media provided in the PC 21, the playback apparatus 22, the television 23 and the playback apparatus 41.

The recording configuration of the medium illustrated in FIG. 16 is realized upon, for example, the following recording processing.

(1) The PC 21, the playback apparatus 22, the television 23 and the playback apparatus 41 as the user devices 20 record data acquired from the content providing servers 12*a* and 12*b*, in the memory card 30 according to the data recording configuration illustrated in FIG. 16.

Alternatively, (2) The PC 21, the playback apparatus 22, the television 23 and the playback apparatus 41 as the user devices 20 record data acquired from the content providing servers 12a and 12b, in the recording medium such as the hard disk of the user device according to the data recording configuration illustrated in FIG. 16.

The data recording configuration illustrated in FIG. 16 is applicable in both of cases (1) and (2).

An example of executing the above processing (1), that is, as processing example of performing recording according to the data recording configuration illustrated in FIG. 16 when the PC 21, the playback apparatus 22, the television 23 and the playback apparatus 41 as the user devices 20 record data acquired from the content providing servers 12a and 12b, in the memory card 30 will be described below.

A processing example in case that the memory card 30 is attached to the PC 21 of the user devices 20 illustrated in FIG. 1 to record data in the memory card 30 will be described as a specific example.

That is, a processing example will be described where the PC 21 records recording data employing the recording configuration illustrated in FIG. 16 is recorded in the memory card 30 based on each data such as a content file, a management information file and key information acquired from the content providing server 12 in advance and recorded in the hard disk of the PC 21.

As illustrated in FIG. 16, in the memory card 30, each data such as (a) a content file 510, (b) management information and first key data 520 and (c) second key data 530 is recorded.

The third embodiment provides the almost same recording configuration as the data recording configuration according to the first embodiment described above with reference to FIG. 2. Meanwhile, (a) A difference is that a flag and, in addition, content file identification information (#x) are recorded in the security box 511 in the content file 510.

In addition, data configurations of (b) management information and first key data 520 and (c) second key data 530 are the same as the data configurations described with reference to FIG. 2.

Data to be recorded in the security box of the content file is different.

A flag is the same flag as the flag described above with reference to FIG. 2, and is a flag including information as to whether or not it is necessary to refer to a management information file upon use of content.

In the present embodiment, in the security box 511,
content file identification information (#x)
is further recorded.

When playing back content included in a content file, the playback apparatus
determines whether or not it is necessary to perform processing of referring to a management information file according to a flag value of a security box and
further
selects and acquires a management information file based on the content file identification information (#x) recorded in the security box.

In addition, also in the present embodiment, the content file identifier (#x) is set to file names of the token file 521 and the usage control information file 522. Alternatively, the directory name is set.

Consequently, similar to the first embodiment, according to the present embodiment, it is possible to correctly select management information associated with playback scheduled content based on the content file identifier (#x) as a search key.

The other configurations are the same as those in the first embodiment.

In the key information file 523,
an encrypted title key 524 and
verification values (MAC: Message Authentication Code) 525-1 to n based on coupling information of the content file identifier and a device or medium identifier (the identifier of the memory card 30 illustrated in FIG. 1 in the present embodiment)
are stored.

In the protected area, (c) the second key data 530 is recorded.

More specifically, this is a bind key 531 as illustrated in FIG. 16. The bind key 531 is an encryption key of the encrypted title key 524.

The bind key 531 is recorded in a protected area (Protected Area) of the memory card. In addition, the protected area (Protected Area) is an access limited area, and is an area which the access request apparatus is permitted to access according to access permission information described in a certificate by verifying the certificate presented to the memory card.

12. Example of Content Playback Processing Supported by Data Recording Configuration According to Third Embodiment Next, a playback sequence in case of executing processing of reading and playing back content recorded in a medium employing a data recording configuration described with reference to FIG. 16 will be described with reference to the flowchart illustrated in FIG. 17 and subsequent drawings.

Figure 17:
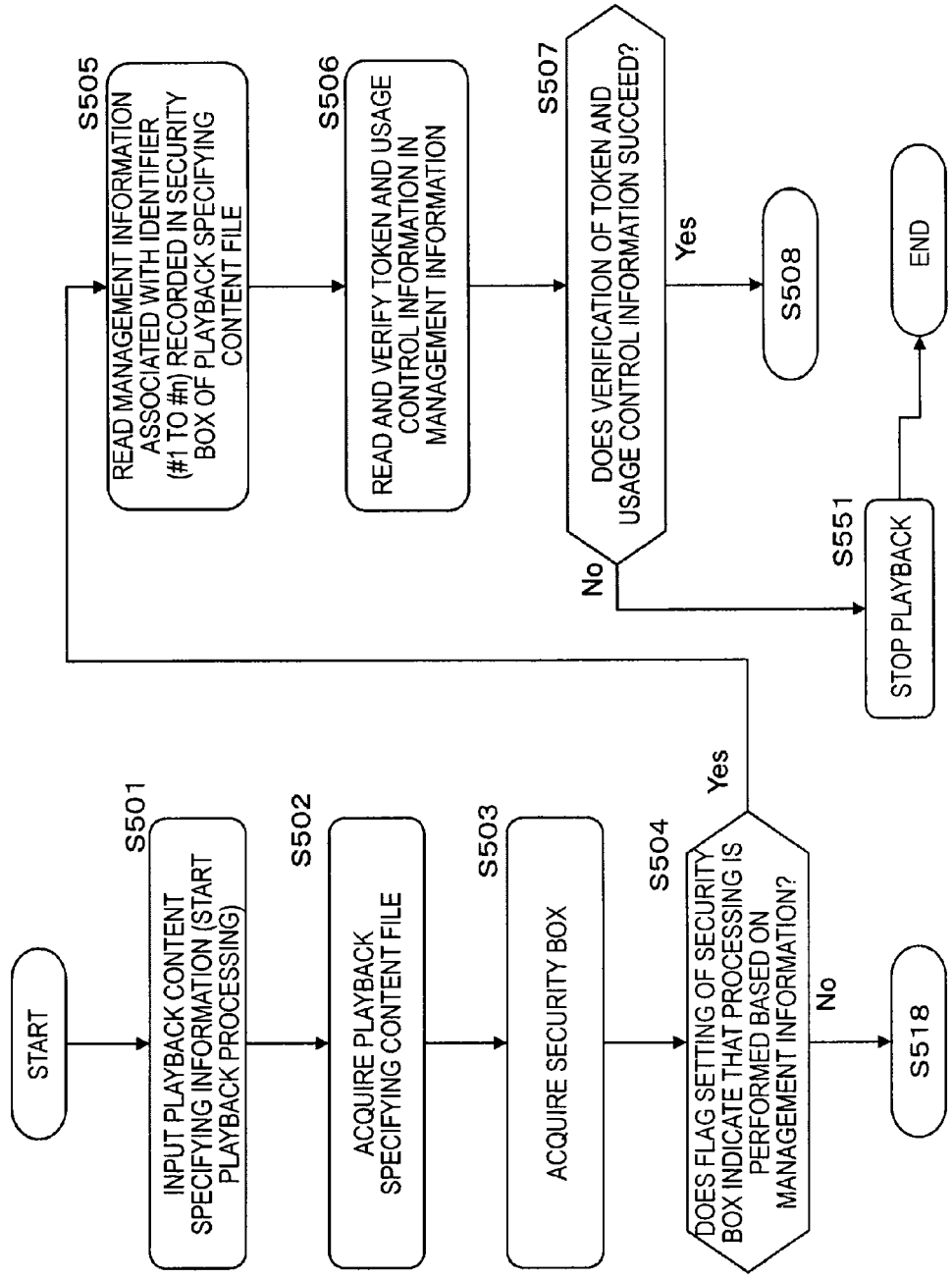
FIG. 17 is a view illustrating a flowchart for explaining a content playback processing sequence.

The content playback processing according to the flowcharts in FIG. 17 and subsequent drawings is executed by an apparatus which executes processing of reading a content file from a medium which stores data illustrated in FIG. 16 and playing back the content file.

The content playback processing is, for example, processing executed when the playback apparatus 41 illustrated in FIG. 1 is attached the memory card 30 which stores data illustrated in FIG. 16 and reads and plays back a content file stored in the memory card 30.

In addition, content playback processing in the playback apparatus 41 is performed when a data processing unit of the playback apparatus 41 executes a playback program (application) stored in the memory of the playback apparatus 41 in advance, and processing in each step illustrated in the flowcharts in FIG. 17 and subsequent drawings is executed by the data processing unit of the playback apparatus 41.

Processing in each step indicated in the flows in FIG. 17 and the subsequence drawings will be described.

First, in step S501, a playback sequence is started by inputting playback content specifying information.

Processing in step S501 is more specifically performed as processing of detecting an input of content specifying information from the user with respect to, for example, content information which is displayed on a display of the playback apparatus 41 and can be played back.

Next, in step S502, a playback specified content file is acquired. For example, a content file recorded in the memory card 30 attached to the playback apparatus 41 is acquired.

More specifically, for example, the data processing unit of the playback apparatus 41 performs processing of reading the content file #1 510-1 illustrated in FIG. 16 from the memory card 30.

Next, in step S503, a security box is acquired from the read content file.

As described above with reference to FIG. 16, in the security box included in the content file, a flag (flag) which indicates an attribute of content included in the content file is recorded.

The flag has, for example, information as to whether or not it is necessary to refer to a management information file upon use of content.

For example, a setting includes flag value=0: it is not necessary to perform processing referring to a management information file and flag value=1: it is necessary to perform processing referring to a management information file.

In step S504, the playback apparatus determines whether or not the flag value of the security box indicates that it is necessary to perform processing referring to a management information file.

When the flag value indicates that it is necessary to perform processing of referring to the management information file, the flow proceeds to step S505.

When the flag value indicates that it is not necessary to perform processing of referring to the management information file, the flow proceeds to step S518 and proceeds to playback of content. This is processing performed with respect to content for which use control is unnecessary such as service content, and is processing in case that content is content which is not encrypted and which can be freely used. In this case, processing in steps S505 to S517 is skipped and the flow proceeds to playback of content included in a content file.

Meanwhile, when the flag value indicates that it is necessary to perform processing of referring to a management information file, the flow proceeds to step S505 to read a management information file.

Similar to the first embodiment, in the present embodiment, upon processing of reading this management information file, the management information file is searched based on a content file identifier (#x) as a search key. Meanwhile, the content file identifier is recorded in the security box in the present embodiment, and can be referred to.

The playback apparatus selects a management information file which has the same identifier as the playback scheduled content file identifier (#1 to #n) in a management information file name, based on this identifier. According to this file selection processing, it is possible to correctly select the management information file associated with the playback scheduled content.

In addition, as described above, a configuration of setting the content file identifier (#1 to #n) to a directory name to which the management information file is set may be employed, and, in this case, a directory which has the same identifier as the content file identifier (#1 to #n) is selected and the management information file set to this directory is selected. According to this file selection processing, it is possible to correctly select the management information file associated with the playback scheduled content.

Next, in step S506, the playback apparatus reads a token and usage control information which are management information files associated with playback scheduled content, and verifies a signature for verifying falsification set to these items of data.

When it is determined in step S507 that verification succeeds, the flow proceeds to step S508 and, when verification does not succeed, the flow proceeds to step S551 and playback processing is stopped.

When it is determined in step S507 that verification succeeds and validity of the token and usage control information is checked, the flow proceeds to step S508 and content based on constituent data of the token and the usage control information is verified or permission processing is checked.

Next, in step S509, the playback apparatus reads a medium ID which is an identifier of the memory card which stores a content file.

Next, in step S510, the playback apparatus calculates a verification value (for example, MAC) based on the read medium ID and the playback scheduled content file identifier (#x). In addition, this calculating algorithm is an algorithm determined in advance, and the same algorithm as an algorithm of calculating a MAC stored in the key information file 523 described above with reference to FIG. 16 is applied.

Next, in step S511, the playback apparatus acquires a verification value (MAC) stored in the key information file 523 described with reference to FIG. 16 and, in step S512, the playback apparatus executes processing (MAC verification) of matching the calculated MAC value and the verification value (MAC) stored in the key information file 523.

In step S513, when it is determined that the calculated MAC and the read MAC match, it is determined that a medium is subjected to valid content writing processing and processing in steps subsequent to step S514 is executed.

In step S513, when it is determined that the calculated MAC and the read MAC do not match, it is determined that there is a probability that a medium is not subjected to valid content writing processing and the flow proceeds to step S551 to stop processing without executing processing in steps subsequent to step S514.

When the calculated MAC and the read MAC match in step S513 and the flow proceeds to step S514, the playback apparatus reads an encryption key (bind key) recorded in a protected area of the memory card.

In addition, as a precondition of an access to this protected area, the playback apparatus presents a certificate (for example, a public key certificate) of the playback apparatus to the memory card. Only when the memory card determines whether or not there is an access right to the protected area based on the certificate received from the playback apparatus, and authorizes the access right, processing of reading a bind key from the protected area in step S514 is executed.

When the access right is not authorized, the processing in step S514 is not executed and playback of content is not permitted.

When the access right to the protected area of the memory card of the playback apparatus is checked and processing of reading the bind key from the protected area in step S514 is executed, in step S515, the playback apparatus then reads an encrypted title key associated with playback scheduled content from the encryption key file 523 illustrated in FIG. 16.

Next, in step S516, the playback apparatus executes processing of decoding the encrypted title key using the bind key and acquires a title key.

Further, in step S517, processing of decoding encrypted content in a playback scheduled content file by using the acquired title key is executed, and, in step S518, the decoded content is played back.

13. Example of Content Recording Processing Supported by Data Recording Configuration According to Third Embodiment Next, a sequence of executing processing of recording data employing a data recording configuration described with reference to FIG. 16 will be described with reference to FIG. 20.

Hereinafter, a sequence in case that the PC 21 as the user device 20 illustrated in FIG. 1 records, for example, content recorded in a medium (for example, a hard disk) of the PC, in a detachable medium such as the memory card 30 will be described as an example of data recording processing.

Figure 20:
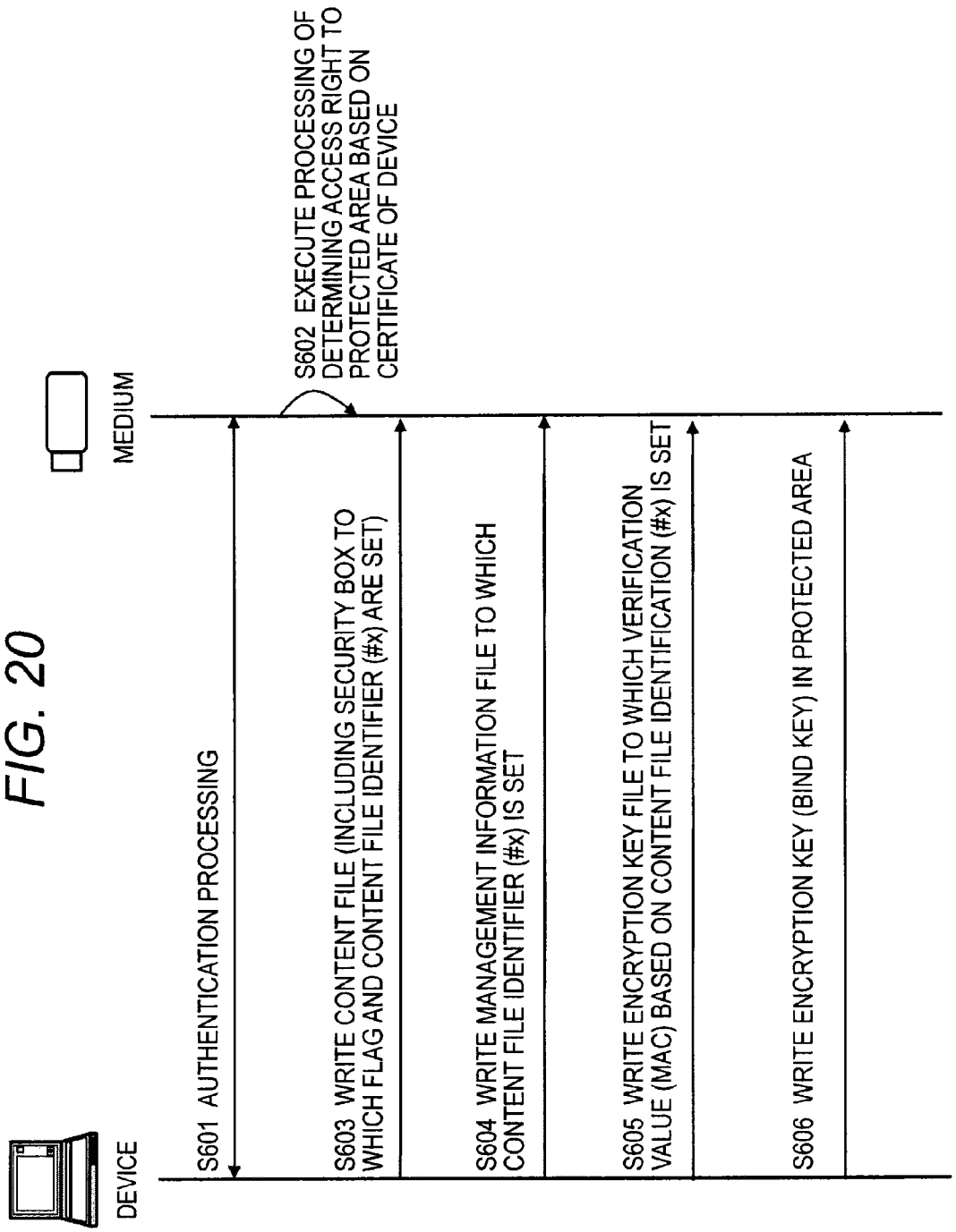
FIG. 20 is a view illustrating a sequence diagram for explaining a data recording sequence.

FIG. 20 illustrates a device (for example, the PC 21 illustrated in FIG. 1) which holds and outputs content and a medium (for example, the memory card 30 illustrated in FIG. 1) which is a content recording target from the left.

In addition, although FIG. 20 illustrates processing between a device and a medium as an example of content recording processing, the content recording processing can be executed not only between the device and the medium but also between a PC and a playback apparatus as inter-device processing, and can be further executed between a server and a device and between a server and a medium.

A device which executes content recording illustrated in FIG. 20 is a device which holds, for example, encrypted content, management information of the encrypted content and an encryption key from the content providing server 12 illustrated in FIG. 1.

The management information includes the following information described above with reference to FIG. 16.

The management information includes (a) a token (Token) and (b) usage control information (Usage File).

Each processing will be described according to the sequence diagram in FIG. 20.

First, a device is attached a medium (for example, a memory card), and executes mutual authentication processing between the device and the medium in step S601. According to, for example, a public key encryption method, mutual authentication processing including processing of exchanging mutual public key certificates of the device and the medium is performed.

Both of the device and medium (memory card) hold certificates (Certificate) which store public keys issued by a certificate authority, and private keys. The certificate (Certificate) held by the device is the host certificate (Host Certificate) described above with reference to FIG. 8, and access right information related to a protected area of a memory card is recorded therein in addition to a public key.

In addition, the medium (memory card) stores programs which perform mutual authentication processing and determine whether or not an access can be made to the protected area (Protected Area), and has a data processing unit which executes these programs.

When mutual authentication between the device and the medium (memory card) succeeds, validity of both is checked, and processing subsequent to step S602 is executed.

When mutual authentication does not succeed, processing subsequent to step S602 is not executed.

When mutual authentication between the device and the medium succeeds and validity of both is checked, the data processing unit of the medium refers to the public key certificate (host certificate (Host Certificate) illustrated in FIG. 8) provided to the medium by the device upon authentication processing in step S602, and checks an access right to the protected area (Protected Area) of the medium.

In addition, upon processing of recording content in the medium, it is necessary to write an encryption key (bind key) in the protected area (Protected Area) of the medium. Hence, the data processing unit of the medium checks whether or not write (Write) permission information with respect to one or more partitioned areas of the protected area (Protected Area) is recorded in the certificate (host certificate (Host Certificate) illustrated in FIG. 8) received from the device.

When there is no write (Write) permission information with respect to a partitioned area, this device is not permitted to write an encryption key in the protected area (Protected Area) of the medium (memory card). In this case, processing subsequent to step S603, that is, processing of providing content to a medium is stopped.

When write (Write) permission information with respect to one or more partitioned areas of the protected area (Protected Area) of a medium is recorded in the certificate (host certificate (Host Certificate) illustrated in FIG. 8) provided from the device to the medium, an encryption key provided by the device can be recorded in the protected area (Protected Area) and, only in this case, processing subsequent to step S603 is executed.

In steps S603 to S606, the device transmits the following data to the medium, and performs writing processing.

(a) Content File
(b) Management Information and First Key Data
(c) Encryption Key (Bind Key)

These pieces of information correspond to data (a) to (c) described with reference to FIG. 16.

In step S603, a content file is written.

A security box described above with reference to FIG. 2 is set to a content file to provide to a medium. That is, the security box is a security boxy which has a flag to which information indicating whether or not it is necessary to perform processing referring to a management information file upon content playback is set, and the content file identifier (#x).

In step S604, management information files in (b) management information and first key data are written.

The management information files are, for example, a token file and a usage control information file included in (b) the management information and the first key data described with reference to FIG. 16. File names of these management information files are recorded as file names including a content file identifier (#x). Alternatively, these management information files are recorded in a directory including the content file identifier (#x) in a directory name.

In addition, these file names may be set or the directory name may be set by the data processing unit of the medium not by processing on the medium side.

In step S605, first key data in (b) the management information and the first key data is written.

The first key data included in (b) the management information and the first key data is the key information file 123 illustrated in FIG. 2. The key information file includes an encrypted title key encrypted by a bind key and, in addition, an ID verification value (#x).

As described above with reference to FIG. 16, the ID verification value (#x) is a verification value (MAC) generated based on an ID (medium ID/device ID) of a medium or a device which records a content file and the content file identifier (#x).

A device which executes content recording processing acquires a medium ID which is a content recording destination such as the memory card in this example, generates the verification value (MAC) based on this medium ID and the content file identifier, stores the verification value in the key information file 523, and provides the verification value to the medium (memory card) to record.

In addition, the medium ID is recorded in the public key certificate provided from the medium to the device upon authentication processing in step S601.

In step S606, the encryption key (bind key) is written.

The encryption key (bind key) is recorded in the protected area (Protected Area) of the medium as illustrated in FIG. 16. In addition, writing processing with respect to this protected area is executed with respect to an area for which an access right is authorized as a result of access right determination based on the certificate of the device performed by the medium in step S602.

Upon processing of recording a content file, a flag indicating whether or not it is necessary to refer to management information and the content file identifier are set to a content file.

A content file identifier is included in a file name of a management information file or a set directory.

A verification value (MAC) based on an ID of a content recording device (a device or a medium) is recorded in the encryption key file.

The bind key is recorded in the protected area.

These processing is executed.

Figure 18:
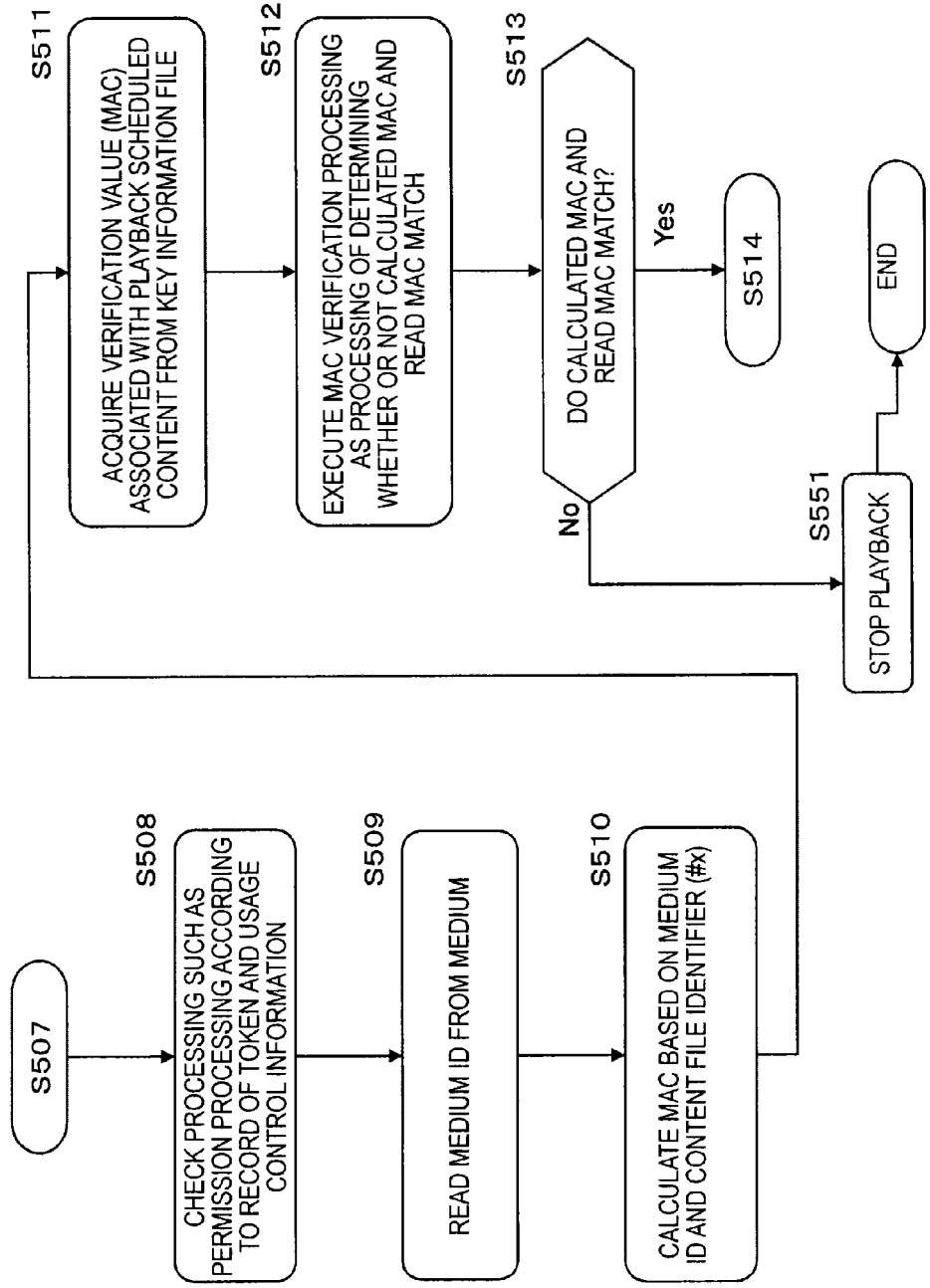
FIG. 18 is a view illustrating a flowchart for explaining a content playback processing sequence.
Figure 19:
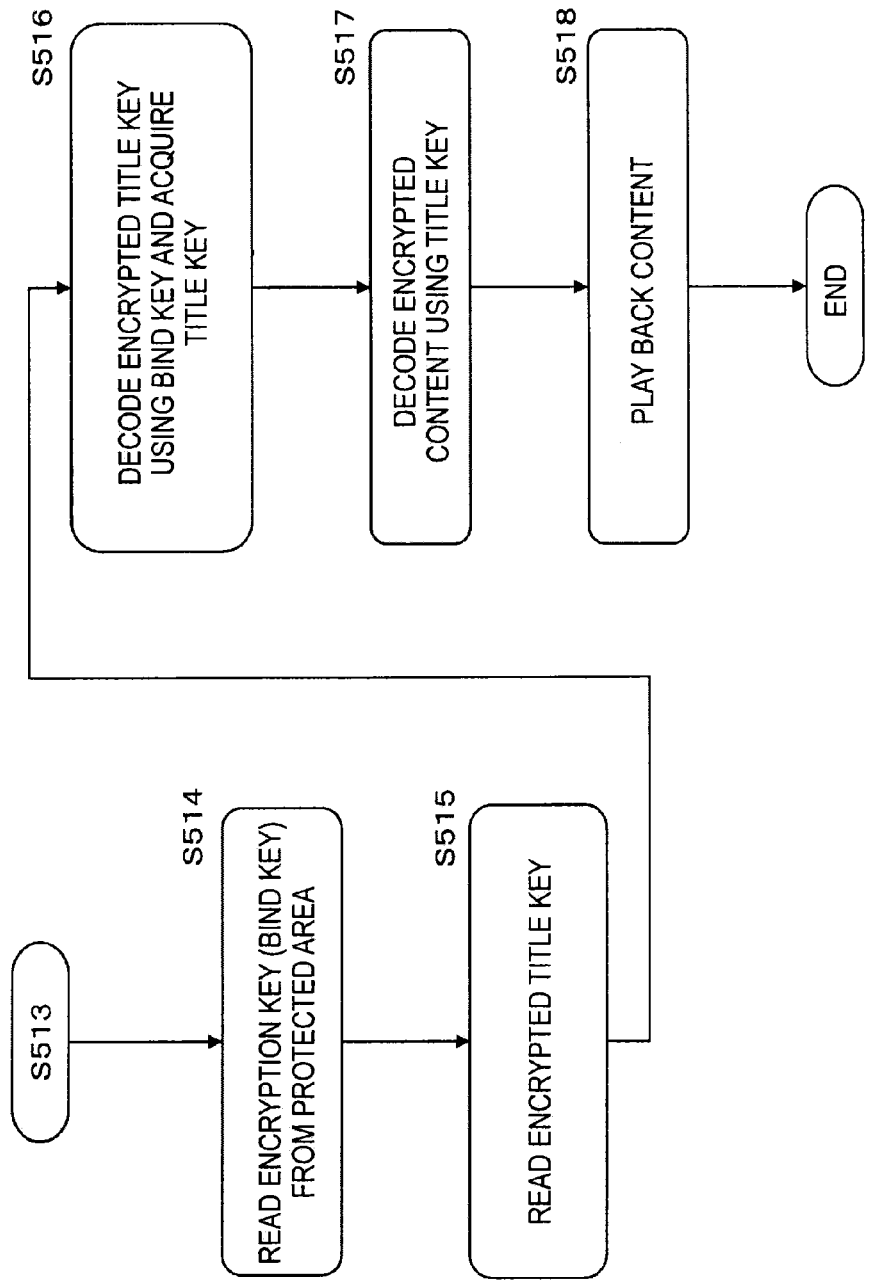
FIG. 19 is a view illustrating a flowchart for explaining a content playback processing sequence.

Upon content playback processing, processing is executed based on these items of recorded data according to the flows described above with reference to FIGS. 17 to 19.

More specifically, it is possible to perform the following processing upon playback processing.

It is possible to determine whether or not it is necessary to refer to management information based on a flag value of the security box of the content file.

It is possible to reliably select a management information file associated with content based on an identifier of a content file of a file name of a management information file or a set directory.

It is possible to verify whether or not content is recorded in a medium or a device according to a valid recording sequence, based on a verification value (MAC) based on the ID of the content recording device (a device or a medium) set to the encryption key file.

By acquiring a bind key from the accessible protected area based on the certificate, only the device which has the access right to the protected area can play back content.

According to this processing, it is possible to realize valid content usage processing.

14. Hardware Configuration Example of Each Apparatus

Finally, a hardware configuration example of each apparatus which executes the above processing will be described with reference to FIGS. 21 and 22.

First, the hardware configuration example of a host device which is attached a memory card and performs processing of recording or playing back data will be described with reference to FIG. 21.

A CPU (Central Processing Unit) 701 functions as a data processing unit which executes various processing according to a program stored in a ROM (Read Only Memory) 702 or a memory unit 708. The CPU executes, for example, processing of performing communication with a server described above in each of the above embodiments, recording data received from the server in a memory card (a removable medium 711 in the drawing) and processing of playing back data from the memory card (the removable medium 711 in the drawing). In a RAM (Random Access Memory) 703, for example, programs executed by the CPU 701 and data are appropriately stored. These CPU 701, ROM 702 and RAM 703 are mutually connected through a bus 704.

The CPU 701 is connected to an input/output interface 705 through the bus 704, and the input/output interface 705 is connected with an input unit 706 formed with various switches, a keyboard, a mouse and a microphone and an output unit 707 formed with a display and speakers. The CPU 701 executes various processing in response to a command inputted from the input unit 706, and outputs a processing result to, for example, the output unit 707.

The memory unit 708 connected to the input/output interface 705 includes, for example, a hard disk, and stores programs executed by the CPU 701 and various items of data. The communication unit 709 performs communication with an external apparatus through a network such as the Internet or a local area network.

A drive 710 connected to the input/output interface 705 drives the removable medium 711 such as a magnetic disk, an optical disk, a magnetooptic disc or a semiconductor memory, and acquires various items of data such as recorded content or key information. Using the acquired content or key data, processing of decoding or playing back content is performed according to a playback program executed by the CPU.

Figure 22:
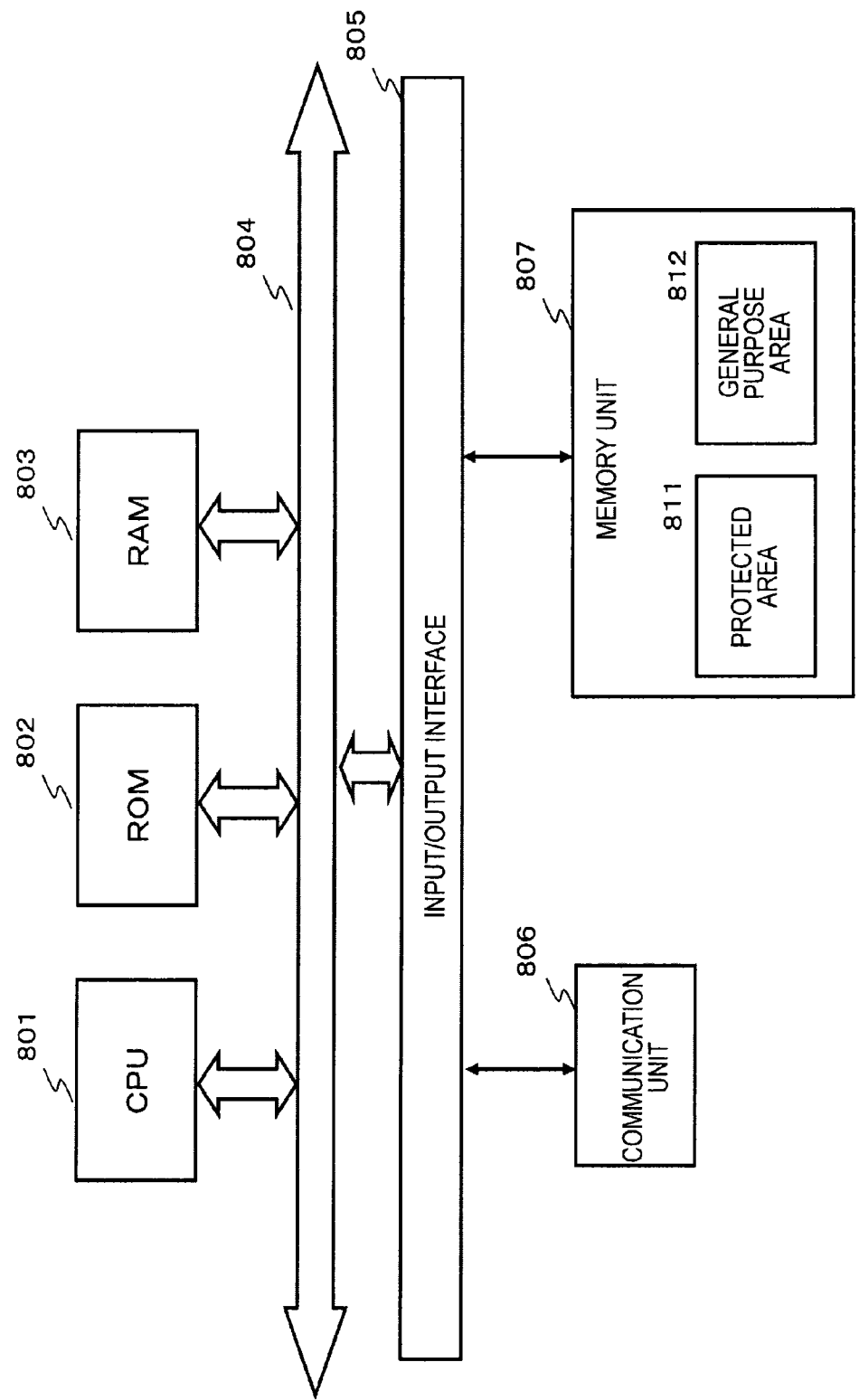
FIG. 22 is a view for explaining a hardware configuration example of the memory card.

FIG. 22 illustrates a hardware configuration example of the memory card.

A CPU (Central Processing Unit) 801 functions as a data processing unit which executes various processing according to a program stored in a ROM (Read Only Memory) 802 or a memory unit 807. The CPU executes, for example, processing of performing communication with a server or a host device described in each of the above embodiments, processing of writing and reading data in and from the memory unit 807 and processing of determining whether or not an access can be made in partitioned area units of a protected area 811 of the memory unit 807. In a RAM (Random Access Memory) 803, for example, programs executed by the CPU 801 and data are appropriately stored. These CPU 801, ROM 802 and RAM 803 are mutually connected through a bus 804.

The CPU 801 is connected to an input/output interface 805 through the bus 804, and the input/output interface 805 is connected with the communication unit 806 and the memory unit 807.

The communication unit 804 connected to the input/output interface 805 performs communication with, for example, a server or a host device. The memory unit 807 is a data storage area, and has a protected area (Protected Area) 811 to which an access is limited as described above and a general purpose area (General Purpose Area) 812 which data can be freely recorded in and read from.

Figure 21:
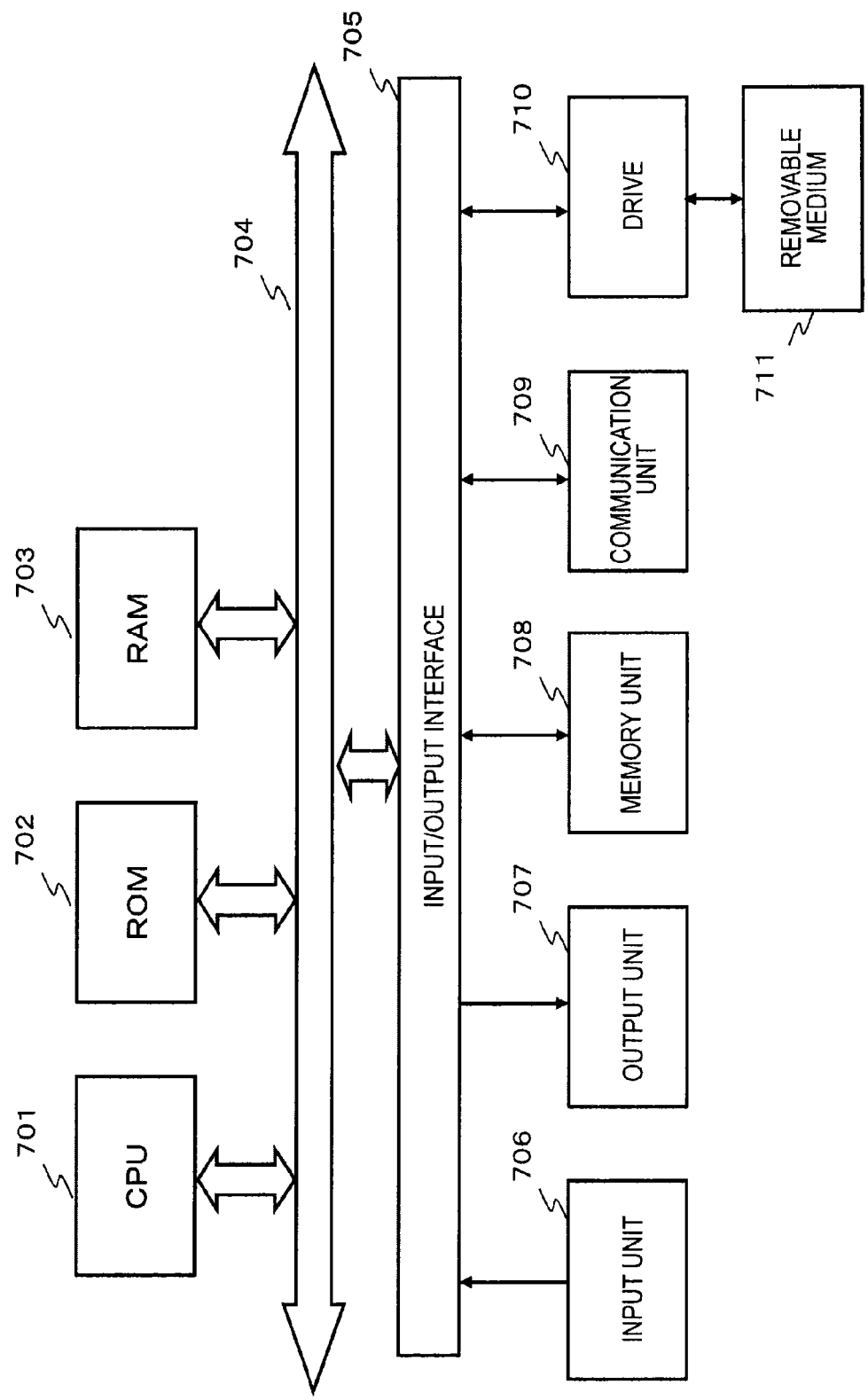
FIG. 21 is a view for explaining a hardware configuration example of a host device to which a memory card is attached and which records and plays back data.

In addition, the server can be realized by, for example, an apparatus which employs the same hardware configuration as that of the host device illustrated in FIG. 21.

15. Conclusion of Configuration of Present Disclosure

The embodiments of the present disclosure have been described in detail with reference to the specific embodiments above. However, obviously, one of ordinary skill in art can correct or substitute the embodiments without deviating from the spirit of the present disclosure. That is, the present invention has been disclosed as an exemplary embodiment, and should not be interpreted in a limited manner. The claims should be considered to decide the spirit of the present disclosure.

In addition, the technique disclosed in this description can employ the following configuration.

(1) An information processing apparatus has a data processing unit which executes processing of reading data stored in a recording medium and playing back the data, and the data processing unit acquires a content file including encrypted content stored in the recording medium, and determines whether or not it is necessary to refer to a management information file based on a setting of a flag referring to the flag recorded in the content file, and when the setting of the flag indicates that it is necessary to refer to the management information file, executes processing of searching the management information file based on an identifier of the content file as a search key.

(2) In the information processing apparatus described in (1), the identifier of the content file is set to a file name of the management information file stored in the recording medium, and the data processing unit executes processing of selecting a management information file which has a file name to which an identifier identical to an identifier of a playback scheduled content file is set.

(3) In the information processing apparatus described in (1) or (2), the management information file stored in the recording medium is set to a directory which has a directory name including the identifier of the content file, and the data processing unit executes processing of selecting a management information file which is set to a directory to which an identifier identical to an identifier of a playback scheduled content file is set.

(4) In the information processing apparatus described in one of (1) to (3), the data processing unit executes processing of searching a management information file based on a content file identifier recorded in the content file as the search key.

(5) In the information processing apparatus described in one of (1) to (4), the data processing unit calculates a verification value based on an identifier (medium ID) of the recording medium, executes processing of matching the verification value and a verification value recorded in the recording medium, and performs processing of playing back the encrypted content on a condition that a match is found.

(6) In the information processing apparatus described in one of (1) to (5), the data processing unit outputs a certificate of the information processing apparatus to the recording medium, reads an encryption key from a protected area on a condition of permission determination as to an access right to the protected area of the recording medium based on verification of the certificate in the recording medium, and executes content decoding/playback processing to which the encryption key is applied.

(7) An information processing apparatus has a data processing unit which executes processing of reading data stored in a recording medium and playing back the data, and the data processing unit acquires a content file including encrypted content stored in the recording medium, and determines whether or not it is necessary to refer to a management information file based on a setting of a flag referring to the flag recorded in the content file, and when the setting of the flag indicates that it is necessary to refer to the management information file, executes processing of referring to the management information file stored in the content file.

(8) An information processing apparatus has a data processing unit which executes processing of recording data in a recording medium, and the data processing unit records a content file including encrypted content in the recording medium;

sets to the content file a flag indicating whether or not it is necessary to refer to a management information file upon processing of playing back the encrypted content; and records a management information file which has a file name including a content file identifier or a management information file under a directory which has a directory name including the content file identifier.

(9) In the information processing apparatus described in (8), the data processing unit calculates a verification value based on an identifier (medium ID) of the recording medium and records the calculated verification value in the recording medium.

(10) An information recording medium has as recorded data a content file including encrypted content which is a playback target in a playback apparatus, and stores in the content file a flag indicating whether or not it is necessary to refer to a management information file upon processing of playing back the encrypted content, and upon content playback processing in the playback apparatus, enables execution of determination as to whether or not it is necessary to refer to the management information file based on a setting of the flag.

(11) The information recording medium described in (10) stores as recorded data a verification value based on an identifier (medium ID) of the information recording medium, and, upon the content playback processing in the playback apparatus, enables the playback apparatus to calculate the verification value based on the identifier (medium ID) of the information recording medium, execute processing of matching the calculated verification value and a recorded verification value, and perform permission determination processing of content playback according to a matching result.

Further, a method of processing executed by, for example, the above apparatus and a program which causes the apparatus to execute processing are also incorporated in the configuration of the present disclosure.

Furthermore, a series of processing described in the description can be executed by hardware, software or a complex configuration of both. When processing is executed by software, a program in which a processing sequence is recorded can be installed in a memory in a computer mounted on dedicated hardware and executed, or the program can be installed in a general purpose computer which can execute various processing and executed. For example, the program can be recorded in advance in a recording medium. The program can be installed from a recording medium to a computer, and, in addition, can be received through a network such as a LAN (Local Area Network) or the Internet and installed in a recording medium such as a built-in hard disk.

In addition, various processing described in the description may be not only executed in a time sequence as described above but also executed in parallel or individually according to processing performance of an apparatus which executes processing or where necessary. Further, a system in this description refers to a logical set configuration of a plurality of apparatuses, and is not limited to a configuration in which apparatuses employing each configuration are provided in a single housing.

INDUSTRIAL APPLICABILITY

As described above, a configuration according to one embodiment of the present disclosure can execute predetermined content usage control processing without depending on a framework of a content playback program (application).

More specifically, upon content playback processing, a flag to which information of determination as to whether or not it is necessary to refer to a management information file such as a token or a usage control information file associated with content is set is recorded in a content file including encrypted content stored in a recording medium.

According to the present configuration, upon content playback processing, a playback apparatus can acquire a content file including encrypted content stored in a recording medium, refer to a flag recorded in the content file and determine whether or not it is necessary to refer to a management information file based on a setting of the flag. Further, when the setting of the flag indicates that it is necessary to refer to the management information file, the playback apparatus can select the correct management information file based on a content file identifier as a search key.

REFERENCE SIGNS LIST

11 Management server
12 Content providing server
20 User device
21 PC
22 Playback apparatus
23 Television
30 Memory card
31 Playback apparatus
110 Content file
111 Security box
112 Flag
120 Management information and first key data
121 Token file
122 Usage control information file
123 Key information file
124 Encrypted title key
125 ID verification value
130 Second key data
131 Encryption key (bind key)
200 Memory card
210 Protected area
220 General purpose area
222 Host device
310 Content file
311 Security box
321 Flag
322 Token file
323 Usage control information file
324 ID verification value
325 Encrypted title key
350 Second key data
351 Encryption key (bind key)
510 Content file
511 Security box
512 Flag
513 Content file identifier
520 Management information and first key data
521 Token file
522 Usage control information file
523 Key information file
524 Encrypted title key
525 ID verification value
530 Second key data
531 Encryption key (bind key)
701 CPU
702 ROM
703 RAM
704 Bus
705 Input/output interface
706 Input unit
707 Output unit
708 Memory unit
709 Communication unit
710 Drive
711 Removable medium
801 CPU
802 ROM
803 RAM
804 Bus
805 Input/output interface
806 Communication unit
807 Memory unit
811 Protected area
812 General purpose area

The invention claimed is:

1. An information processing apparatus, comprising:
one or more processors configured to:
read data stored in a recording medium and play back the data;
acquire a content file that comprises encrypted content stored in the recording medium;
determine whether it is necessary to refer to a management information file, based on a setting of a flag recorded in the content file, wherein the management information file comprises a token file;
in an event the setting of the flag indicates that it is necessary to refer to the management information file, search the management information file based on an identifier of the content file as a search key, and select the management information file associated with the identifier of the content file,
wherein the identifier of the content file is a combination of a server ID of a content providing server configured to provide the data stored in the recording medium and a unique content ID associated with the content file, and wherein the server ID is set by a certificate authority and the unique content ID is set by the content providing server; and
verify a validity of the token file of the selected management information file associated with the identifier of the content file.

2. The information processing apparatus according to claim 1, wherein
the identifier of the content file is set to a file name of the management information file stored in the recording medium, and the one or more processors are further configured to select the management information file with the file name identical to an identifier of a playback scheduled content file.

3. The information processing apparatus according to claim 1, wherein the management information file stored in the recording medium is set to a directory, wherein the directory comprises a directory name that comprises the identifier of the content file, and the one or more processors are further configured to select the management information file which is set to the directory with the identifier identical to an identifier of a playback scheduled content file.

4. The information processing apparatus according to claim 1, wherein the one or more processors are further configured to search the management information file based on the identifier of the content file recorded in the content file as the search key.

5. The information processing apparatus according to claim 1, wherein the one or more processors are further configured to:

calculate a verification value based on an identifier (medium ID) of the recording medium;

match the calculated verification value and a verification value recorded in the recording medium; and play back the encrypted content on a condition that a match is found.

6. The information processing apparatus according to claim 1, wherein the one or more processors are further configured to:

output a certificate of the information processing apparatus to the recording medium;

read an encryption key from a protected area on a condition of permission determination as to an access right to the protected area of the recording medium based on verification of the certificate in the recording medium; and decode or playback the encrypted content based on application of the encryption key.

7. An information processing apparatus, comprising:
one or more processors configured to:
read data stored in a recording medium and play back the data;
acquire a content file that comprises encrypted content stored in the recording medium; and
determine whether it is necessary to refer to a management information file, based on a setting of a flag recorded in the content file, wherein the management information file comprises a token file;
in an event the setting of the flag indicates that it is necessary to refer to the management information file, refer to the management information file stored in the content file to select the management information file associated with an identifier of the content file, based on a server ID of a content providing server configured to provide the data stored in the recording medium, wherein the identifier of the content file is a combination of the server ID and a unique content ID associated with the content file, and wherein the server ID is set by a certificate authority and the unique content ID is set by the content providing server; and
verify a validity of the token file of the selected management information file associated with the identifier of the content file.

8. An information processing apparatus, comprising:
one or more processors configured to:
record data in a recording medium;
record a content file that comprises encrypted content in the recording medium;
set to the content file a flag that indicates whether it is necessary to refer to a management information file upon play back of the encrypted content, wherein the management information file comprises a token file; and
record a management information file which comprises a file name that comprises a content file identifier or record the management information file under a directory which comprises a directory name that comprises the content file identifier,
wherein the content file identifier of the management information file is a combination of a server ID of a content providing server configured to provide the data stored in the recording medium and a unique content ID associated with the content file, and wherein the server ID is set by a certificate authority and the unique content ID is set by the content providing server, and wherein a validity of the token file of the recorded management information file associated with the content file identifier is verified.

9. The information processing apparatus according to claim 8, wherein the one or more processors are further configured to:
calculate a verification value based on an identifier (medium ID) of the recording medium; and
record the calculated verification value in the recording medium.

10. A non-transitory computer-readable medium having stored thereon, computer-executable instructions for causing a computer to perform an operation, comprising:
recording data as a content file comprising encrypted content which is a playback target in a playback apparatus;
storing in the content file a flag indicating whether it is necessary to refer to a management information file upon playing back the encrypted content, wherein the management information file comprises a token file;
upon content playback in the playback apparatus, enabling execution of determination as to whether it is necessary to refer to the management information file based on a setting of the flag;
in an event it is determined that it is necessary to refer to the management information file, searching the management information file based on a server ID of a content providing server configured to provide the data stored in the recording medium, for selecting the management information file associated with the server ID, wherein the identifier of the content file is a combination of the server ID and a unique content ID associated with the content file, and wherein the server ID is set by a certificate authority and the unique content ID is set by the content providing server; and
verifying a validity of the token file of the selected management information file associated with the server ID.

11. The non-transitory computer-readable medium according to claim 10, wherein the computer-executable instructions cause the computer to further perform the operation, comprising:
storing as recorded data a verification value based on an identifier (medium ID) of the non-transitory computer readable medium; and upon the content playback in the playback apparatus, enabling the playback apparatus to calculate the verification value based on the medium ID;

matching the calculated verification value and a recorded verification value; and determining permission of content playback according to a matching result.

12. An information processing method, comprising:

in an information processing apparatus that comprises one or more processors:

reading data stored in a recording medium and playing back the data;

acquiring a content file comprising encrypted content stored in the recording medium;

determining whether it is necessary to refer to a management information file, based on a setting of a flag recorded in the content file, wherein the management information file comprises a token file;

in an event the setting of the flag indicates that it is necessary to refer to the management information file, searching the management information file, based on an identifier of the content file as a search key, to select the management information file associated with the identifier of the content file, wherein the identifier of the content file is a combination of a server ID of a content providing server configured to provide the data stored in the recording medium and a unique content ID associated with the content file, and wherein the server ID is set by a certificate authority and the unique content ID is set by the content providing server; and verifying a validity of the token file of the selected management information file associated with the identifier of the content file.

13. An information processing method, comprising:

in an information processing apparatus that comprises one or more processors:

recording data in a recording medium;

recording a content file comprising encrypted content in the recording medium;

setting to the content file a flag indicating whether it is necessary to refer to a management information file upon playing back the encrypted content, wherein the management information file comprises a token file; and recording a management information file which comprises a file name comprising a content file identifier or recording the management information file under a directory which comprises a directory name comprising the content file identifier, wherein the content file identifier of the management information file is a combination of a server ID of a content providing server configured to provide the data stored in the recording medium and a unique content ID associated with the content file, wherein the server ID is set by a certificate authority and the unique content ID is set by the content providing server, and wherein a validity of the token file of the recorded management information file associated with the content file identifier is verified.

14. A non-transitory computer-readable medium having stored thereon, computer-executable instructions for causing a computer to perform an operation, comprising:

reading data stored in a recording medium and playing back the data;

acquiring a content file comprising encrypted content stored in the recording medium;

determining whether it is necessary to refer to a management information file, based on a setting of a flag recorded in the content file, wherein the management information file comprises a token file;

in an event the setting of the flag indicates that it is necessary to refer to the management information file, searching the management information file based on an identifier of the content file as a search key for selecting the management information file associated with the identifier of the content file, wherein the identifier of the content file is a combination of a server ID of a content providing server configured to provide the data stored in the recording medium and a unique content ID associated with the content file, and wherein the server ID is set by a certificate authority and the unique content ID is set by the content providing server; and verifying a validity of the token file of the selected management information file associated with the identifier of the content file.

15. A non-transitory computer-readable medium having stored thereon, computer-executable instructions for causing a computer to perform an operation, comprising:

recording data as a content file comprising encrypted content in a recording medium;

setting to the content file a flag indicating whether it is necessary to refer to a management information file upon playing back the encrypted content, wherein the management information file comprises a token file; and recording a management information file which comprises a file name comprising a content file identifier or recording the management information file under a directory which comprises a directory name comprising the content file identifier, wherein the content file identifier of the management information file is a combination of a server ID of a content providing server configured to provide the data stored in the recording medium and a unique content ID associated with the content file, and wherein the server ID is set by a certificate authority and the unique content ID is set by the content providing server, and wherein a validity of the token file of the recorded management information file associated with the content file identifier is verified.

* * * * *